US012207638B2

(12) United States Patent
Acharya et al.

(10) Patent No.: US 12,207,638 B2
(45) Date of Patent: Jan. 28, 2025

(54) INSECT SPECIMEN ANALYSIS SYSTEM

(71) Applicant: The Johns Hopkins University, Baltimore, MD (US)

(72) Inventors: Soumyadipta Acharya, Ellicott City, MD (US); Margaret Glancey, Baltimore, MD (US); Adam C. Goodwin, Baltimore, MD (US); Laura Elizabeth Schiffrin Scavo, Bethesda, MD (US); Jewell Brey, Chapel Hill, NC (US); Tristan Ford, Baltimore, MD (US); Collyn J. Heier, Cambridge, MA (US)

(73) Assignee: The Johns Hopkins University, Baltimore, MD (US)

( * ) Notice: Subject to any disclaimer, the term of this patent is extended or adjusted under 35 U.S.C. 154(b) by 299 days.

(21) Appl. No.: 17/433,138

(22) PCT Filed: Feb. 19, 2020

(86) PCT No.: PCT/US2020/018771
§ 371 (c)(1),
(2) Date: Aug. 23, 2021

(87) PCT Pub. No.: WO2020/172235
PCT Pub. Date: Aug. 27, 2020

(65) Prior Publication Data
US 2022/0142135 A1 May 12, 2022

Related U.S. Application Data

(60) Provisional application No. 62/809,433, filed on Feb. 22, 2019, provisional application No. 62/809,554, filed on Feb. 22, 2019.

(51) Int. Cl.
*A01M 1/02* (2006.01)
*G06V 20/52* (2022.01)
(Continued)

(52) U.S. Cl.
CPC .............. *A01M 1/026* (2013.01); *G06V 20/52* (2022.01); *H04N 7/183* (2013.01); *H04W 4/029* (2018.02)

(58) Field of Classification Search
CPC .......... A01M 1/026; A01M 1/10; A01M 1/14; G06V 20/52; G06V 20/695; G06V 20/698; H04N 7/183; H04N 7/188; H04W 4/029
See application file for complete search history.

(56) References Cited

U.S. PATENT DOCUMENTS

2017/0112116 A1\* 4/2017 Ji ........................... A01M 1/026
2017/0287160 A1\* 10/2017 Freudenberg ............. G06T 7/62
(Continued)

FOREIGN PATENT DOCUMENTS

KR         10-1642711 B1    7/2016
KR    10-2016-0122476 A    10/2016
(Continued)

OTHER PUBLICATIONS

Machine Translation for KR 10-1642711 B1 (as provided by Applicant) (Year: 2016).\*
(Continued)

*Primary Examiner* — James J Yang
(74) *Attorney, Agent, or Firm* — Harrity & Harrity, LLP

(57) ABSTRACT

An insect trap analysis system may detect an insect specimen on a trap mechanism of an insect trap. The insect trap analysis system may control, based on detecting the insect specimen on the trap mechanism, one or more mechanical devices to: adjust a position of the insect specimen relative to a position of an image capture device associated with the insect trap, or adjust the position of the image capture device relative to the position of the insect specimen. The insect trap analysis system may cause, while controlling the one or (Continued)

more mechanical devices to adjust the position of the image capture device or the position of the insect specimen, the image capture device to capture a plurality of images of the insect specimen from a plurality of different angles relative to the insect specimen, and may perform an action associated with the plurality of images.

24 Claims, 16 Drawing Sheets

(51) Int. Cl.
*H04N 7/18* (2006.01)
*H04W 4/029* (2018.01)

(56) References Cited

U.S. PATENT DOCUMENTS

2018/0084772 A1 3/2018 Peeters et al.
2022/0361471 A1* 11/2022 Patch .................... H04N 7/188

FOREIGN PATENT DOCUMENTS

WO WO-2017165517 A1 * 9/2017 ............ A01M 1/023
WO 2020172235 A1 8/2020

OTHER PUBLICATIONS

International Search Report and Written Opinion—PCT/2020/018771—ISA/KR—Jun. 17, 2020.

* cited by examiner

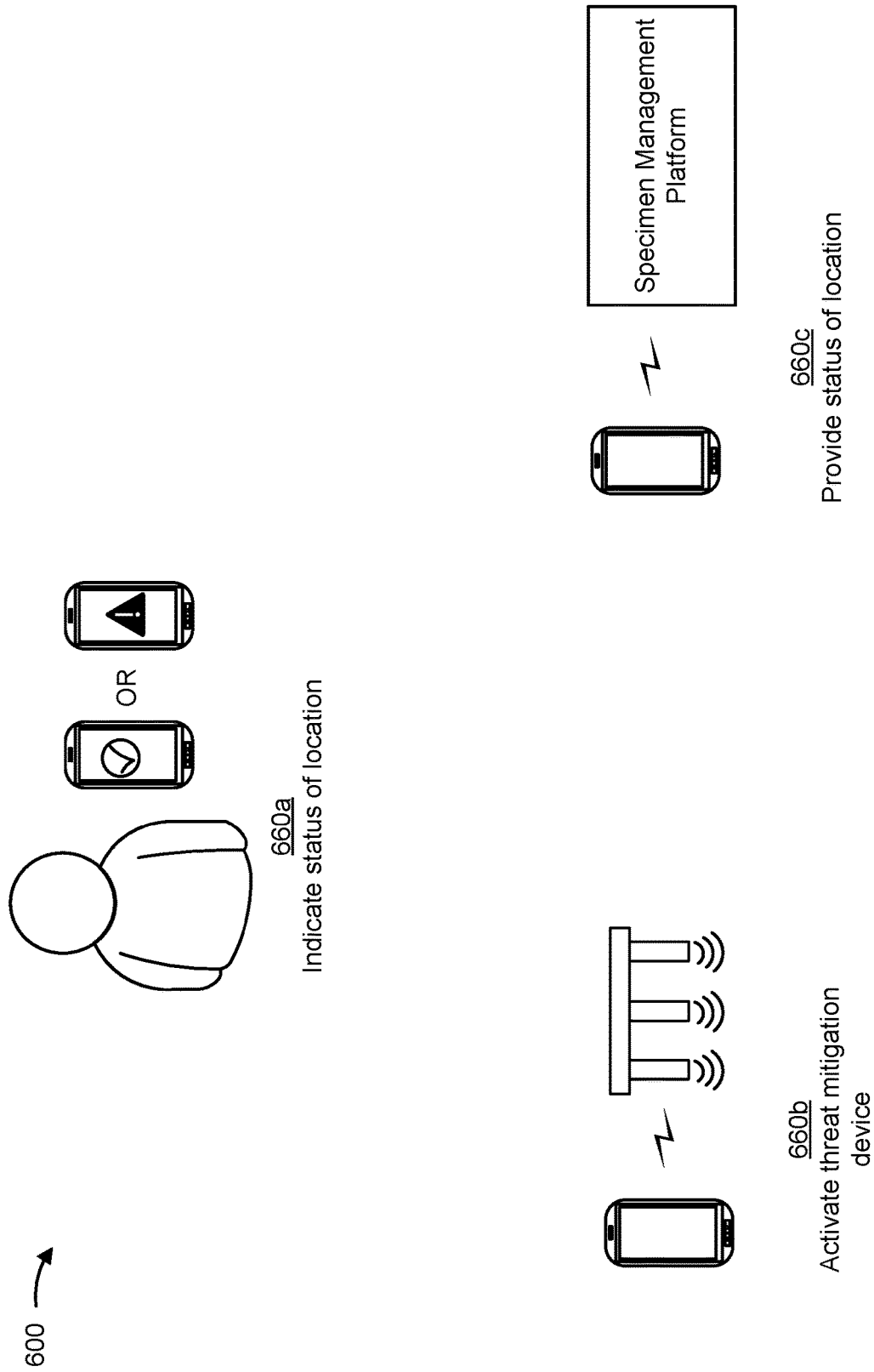

US 12,207,638 B2

INSECT SPECIMEN ANALYSIS SYSTEM

RELATED APPLICATIONS

This application is a 371 national stage of PCT Application PCT/US2020/018771 filed on Feb. 19, 2020, entitled "INSECT SPECIMEN ANALYSIS SYSTEM," which claims priority to U.S. Provisional Patent Application No. 62/809,433, filed on Feb. 22, 2019, and entitled "SPECIMEN ANALYSIS SYSTEM FOR TRAP DEVICE," and to U.S. Provisional Patent Application No. 62/809,554, filed on Feb. 22, 2019, and entitled "MOBILE DEVICE FOR INSECT SPECIMEN DATA ANALYSIS," the contents of each of which are incorporated by reference herein in their entirety.

GOVERNMENT LICENSE RIGHTS

This invention was made with government support under AID-OAA-F-16-00091 awarded by the United States Agency for International Development. The government has certain rights in the invention.

BACKGROUND

Insect traps are used for surveillance of insects and analysis of characteristics of populations of the insects. Insect specimens are collected for lab analysis to enable a statistical analysis to be performed based on the insect specimens. The statistical analysis can indicate characteristics of populations of insects in a particular region or area to enable individual and/or governmental bodies to treat the region or area appropriately.

SUMMARY

According to some implementations, a method may include obtaining an image of an insect specimen, wherein the image is captured from a location associated with the insect specimen; determining, based on the image, a characteristic of the insect specimen; sending, by the mobile device and to a server device, a request for specimen information associated with the insect specimen, wherein the request includes information identifying the location, and wherein the specimen information corresponds to the characteristic of the insect specimen; receiving the specimen information; causing a model to perform an analysis of the specimen information in association with the location, wherein the model is configured to provide a real-time status of the location based on the specimen information; and performing an action associated with the insect specimen based on the real-time status of the location.

According to some implementations, a device may include one or more memories, and one or more processors, communicatively coupled to the one or more memories, configured to: obtain an image of an insect specimen, wherein the image is captured from a location associated with the insect specimen; determine, based on the image, a characteristic of the insect specimen; send, to a server device, a request for specimen information associated with the insect specimen, wherein the request includes information identifying the location; wherein the specimen information corresponds to the characteristic of the insect specimen; receive the specimen information; cause a model to perform an analysis of the specimen information in association with the location, wherein the model is configured to provide a real-time status of the location based on the specimen information; and perform an action associated with the insect specimen based on the real-time status of the location.

According to some implementations, a non-transitory computer-readable medium may store one or more instructions. The one or more instructions, when executed by one or more processors of a device, may cause the one or more processors to: obtain an image of an insect specimen, wherein the image is captured from a location associated with the insect specimen; determine, based on the image, a characteristic of the insect specimen; send, to a server device, a request for specimen information associated with the insect specimen, wherein the request includes information identifying the location; wherein the specimen information corresponds to the characteristic of the insect specimen; receive the specimen information; cause a model to perform an analysis of the specimen information in association with the location, wherein the model is configured to provide a real-time status of the location based on the specimen information; and perform an action associated with the insect specimen based on the real-time status of the location.

According to some implementations, a method may include detecting the insect specimen on a trap mechanism of the insect trap; controlling, based on detecting the insect specimen on the trap mechanism, one or more mechanical devices to: adjust a position of the insect specimen relative to a position of an image capture device associated with the insect trap, or adjust the position of the image capture device relative to the position of the insect specimen; causing, while controlling the one or more mechanical devices to adjust the position of the image capture device or the position of the insect specimen, the image capture device to capture a plurality of images of the insect specimen, wherein the plurality of images are captured from a plurality of different angles relative to the insect specimen; and performing an action associated with the plurality of images.

According to some implementations, a device may include one or more memories, and one or more processors, communicatively coupled to the one or more memories, configured to: detect an insect specimen on a trap mechanism of an insect trap; control, based on detecting the insect specimen on the trap mechanism, one or more mechanical devices to: adjust a position of the insect specimen relative to a position of an image capture device associated with the insect trap, or adjust the position of the image capture device relative to the position of the insect specimen; cause, while controlling the one or more mechanical devices to adjust the position of the image capture device or the position of the insect specimen, the image capture device to capture a plurality of images of the insect specimen, wherein the plurality of images are captured from a plurality of different angles relative to the insect specimen; and perform an action associated with the plurality of images.

According to some implementations, a non-transitory computer-readable medium may store one or more instructions. The one or more instructions, when executed by one or more processors of a device, may cause the one or more processors to: detect an insect specimen on a trap mechanism of an insect trap; control, based on detecting the insect specimen on the trap mechanism, one or more mechanical devices to: adjust a position of the insect specimen relative to a position of an image capture device associated with the insect trap, or adjust the position of the image capture device relative to the position of the insect specimen; cause, while controlling the one or more mechanical devices to adjust the position of the image capture device or the position of the insect specimen, the image capture device to capture a plurality of images of the insect specimen, wherein the plurality of images are captured from a plurality of different angles relative to the insect specimen; and perform an action associated with the plurality of images.

According to some implementations, an insect trap analysis system may include a trap mechanism; a plurality of image capture devices; a communication device; a plurality of mechanical devices; and a controller. The controller may be configured to: detect the insect specimen on the trap mechanism of an insect trap; control, based on detecting the insect specimen on the trap mechanism, one or more of the plurality of mechanical devices to: adjust a position of the insect specimen relative to a position of an image capture device associated with the insect trap or adjust a position of the image capture device relative to the position of the insect specimen; cause, while controlling the one or more of the plurality of mechanical devices to adjust the position of the insect specimen or the position of the image capture device, the image capture device to capture a plurality of images of the insect specimen, wherein the plurality of images are captured from a plurality of different angles relative to the insect specimen; and perform an action associated with the plurality of images.

BRIEF DESCRIPTION OF THE DRAWINGS

FIGS. 6A-6C are diagrams of one or more example implementations described herein.

DETAILED DESCRIPTION

Figure 1:
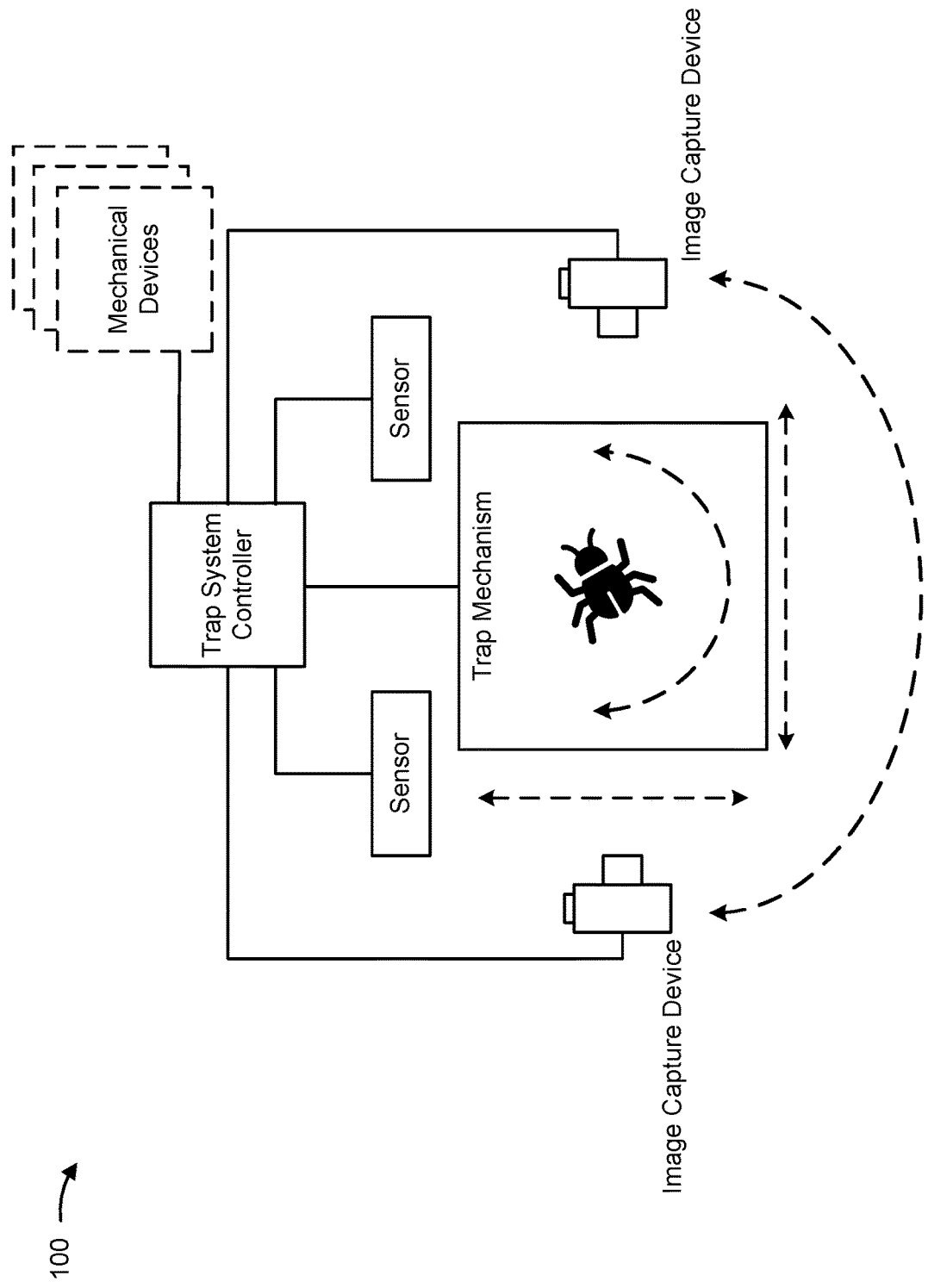
FIG. 1 is a diagram of an example implementation described herein.

The following detailed description of example implementations refers to the accompanying drawings. The same reference numbers in different drawings may identify the same or similar elements.

Insect surveillance generally involves placing one or more insect traps throughout a region to collect insect specimens (e.g., live or deceased insects). Collection and analysis of the insect specimens generally involve a time consuming and/or complex process of individuals physically accessing the insect traps, collecting the insect specimens, and returning the insect specimens to a lab for analysis. Such an analysis can involve identifying a species of the insect, estimating a population of the insects in the region, identifying any diseases associated with the insects, and/or the like. Accordingly, such a relatively time consuming and complex process may involve the use of several resources (e.g., consumable resources used in traveling to each of the insect traps in the region), hardware resources (e.g., wear and tear on vehicles and/or machines to transport the insect specimens), and/or the like. Furthermore, due to the amount of time consumed during such a process, collection of the insect specimens may occur relatively infrequently (e.g., weekly, biweekly, monthly, and/or the like), thus lessening sampling frequency of the insect specimens. Therefore, the relatively low sampling frequency of the insect specimens may result in analyses performed on the insect specimen to be relatively inaccurate. Furthermore, due to the relatively long periods of time between collecting samples, harmful characteristics of the insect population may be detected too late, as irreparable harm from the insects may have already been done between collections of the samples. This can result in harm to an ecosystem of the region (e.g., spread of disease to plants and animals), destruction of consumable produce of the region (e.g., fruits, vegetables, and/or the like), and/or the like.

According to some implementations described herein, an insect trap analysis system enables remote detection, surveillance, and collection of specimens using a trap system to capture an insect, and/or enables a trap system controller to detect an insect specimen, gather information (e.g., from images of the insect specimen) associated with the insect specimen using one or devices (e.g., mechanical devices, image capture devices, and/or the like) of the trap system, and perform one or more actions based on the gathered information. For example, the trap system controller may provide the gathered information to a remote server device (e.g., of a specimen analysis system) for analysis, may perform one or more analyses on the insect specimen to process the insect specimen and/or provide the gathered information as structured data to a remote server device for further analysis (e.g., sorted according to insect specimen, characteristics of the insect specimen, and/or the like). In this way, the insect trap analysis system may remotely collect insect specimens, detect the insect specimens, capture a plurality of images of the insect specimens, gather information associated with the insect specimens, and/or provide the gathered information to a remote server device for further analysis.

FIG. 1 is a diagram of an example implementation 100 described herein. Example implementation 100 may include an insect trap analysis system with a trap system controller, a trap mechanism, one or more sensors, one or more image capture devices, and/or one or more mechanical devices. As described herein, the trap system controller may use the trap mechanism to capture one or more insects, may use the one or more sensors to detect specimens of the one or more insects (referred to herein individually as "insect specimen" or collectively as "insect specimens") in the trap mechanism, may use the image capture devices to capture images of the insect specimen, and may use the one or more mechanical devices to adjust a position of the insect specimen (e.g., by adjusting a position of the trap mechanism), a position of one or more of the image capture devices, and/or a position of one or more of the sensors.

The trap mechanism may include any suitable device capable of trapping an insect and/or holding an insect specimen for analysis. For example, the trap mechanism may include an adhesive substrate (e.g., paper, plastic, glass, and/or the like), an enclosure (e.g., a net, a solid enclosure, and/or the like), and/or the like that is configured to prevent a captured insect from escaping the trap mechanism In some implementations, the trap mechanism may be a component of an insect trap associated with the insect trap analysis system of example implementation 100. For example, the insect trap may include an enclosure and/or housing that holds the devices and/or components of the insect trap analysis system of example implementation 100.

The one or more sensors of FIG. 1 may include any suitable sensor capable of detecting an insect specimen on or within the trap mechanism. For example, the sensor may include a motion sensor, an infrared sensor, a bioluminescent sensor, a microphone (capable of detecting vibrations on or within the trap mechanism), a temperature sensor, and/or the like. Accordingly, based on a signal from the one or more signals indicating a change in the environment, atmosphere, contents, and/or makeup of the trap mechanism, the trap system controller can detect that an insect specimen is on or within the trap mechanism.

In some implementations, the one or more sensors may be configured to monitor for and/or detect particular levels of fluorescence emitted from insect specimens (e.g., mosquito specimens). Additionally, or alternatively, the level of fluorescence may be monitored and/or detected in images of the insect specimens (e.g., via a digital image processing technique or model configured to detect the fluorescence). Such fluorescence may be incited by a particular wavelength of light (e.g., from a light source of the insect trap and/or a light source controlled by trap system controller) and/or caused by a fluorescent tagged dust, a fluorescent tagged food that may have been ingested by the insect, and/or by bacteria emitting radiation or light from within a transparent segment of the insect. Certain levels of fluorescence may correspond to particular species of the insect specimen (e.g., which may be naturally evolved insect specimens or genetically modified insect specimens). In some implementations, the certain levels of fluorescence may indicate one or more other characteristics of the insect specimen, such as whether the insect specimen has been modified in any particular way (e.g., to be a particular gender, to be sterile, and/or the like). Accordingly, a level of fluorescence emitted from the insect specimen can indicate one or more characteristics of the insect specimen. Based on the level of fluorescence, the trap system controller may identify the genus, species, and/or gender of the insect and/or other characteristics of the insect specimen (e.g., source, modifications, diseases associated with the insect specimen, and/or the like) using a mapping of signals from the one or more sensors to corresponding characteristics.

The one or more mechanical devices may include any suitable devices capable of mechanically adjusting a position of a component of the insect trap analysis system. The one or more mechanical devices may include one or more actuators, gears, ratchets, cams, levers, springs, rollers, and/or the like. The one or more mechanical devices may be controlled via one or more wired or wireless communication signals from the trap system controller.

The one or more mechanical devices may be configured to move one or more of the trap mechanism, the one or more sensors, the one or more image capture devices, and/or the like. For example, the one or more mechanical devices may be mechanically connected to (e.g., via one or more interconnects, mounts, fasteners, and/or the like) the trap mechanism, the one or more sensors, and/or the one or more image capture devices such that movement of the one or more mechanical devices causes corresponding movement of the trap mechanism, the one or more sensors, and/or the one or more image capture devices.

In some implementations, the trap system controller may control the one or more mechanical devices based on detecting an insect specimen on or within the trap mechanism. For example, the trap system controller, using one or more signals from a sensor and/or one or more images from an image capture device, may determine that an insect specimen is on or within the trap mechanism, identify the location of the insect specimen relative to the trap mechanism and/or the image capture devices, and control the mechanical devices to adjust a position (e.g., a vertical position, a horizontal position, a pitch, an orientation, and/or the like) of the trap mechanism and/or a position of one or more of the image capture devices.

In this way, the trap system controller may cause the one or more mechanical devices to adjust a position of the insect specimen relative to one or more of the image capture devices associated with the insect trap by adjusting a position of the trap mechanism and/or the image capture devices. Accordingly, the trap system controller may permit the image capture devices to capture one or more images of the insect specimen from a variety of different angles. Having a plurality of images of a same insect specimen that are captured from a variety of different angles of a same insect specimen, rather than a single image of the insect specimen from a single angle, can permit a model (e.g., an insect analysis model) to more accurately analyze, identify, and/or classify the insect specimen.

The one or more image capture devices may include any suitable device that is capable of capturing images of the trap mechanism For example, an image capture device may include a camera, a cluster of photosensitive pixel sensors, and/or the like. In some implementations, one or more of the image capture devices may include a camera of a mobile device (e.g., a smartphone), and/or a camera of a device associated with the trap system controller (e.g., a device that houses the trap system controller).

In some implementations, the trap system controller may cause the image capture device to capture a plurality of images of the insect specimen on the trap mechanism For example, the trap system controller may cause the one or more image capture devices to capture the plurality of images while the trap system controller is controlling the one or more mechanical devices to enable the plurality of images to be captured from different angles. In such cases, the trap system controller may append metadata to each of the plurality of images that includes position information (e.g., one or more sets of coordinates relative to the insect trap, one or more rotational positions of the mechanical devices, and/or the like) of the one or more mechanical devices that identifies a configuration of the one or more mechanical devices at the moment that each of the plurality of images was captured.

The trap system controller may perform one or more actions associated with the plurality of images. In some implementations, the trap system controller may transmit the plurality of images to a server device (e.g., a server device that includes a model to analyze the plurality of images to determine one or more characteristics of the insect specimen). In this way, the insect trap analysis system may enable real-time capture and/or analysis of insect specimens of an insect trap. Additionally, or alternatively, the trap system controller may locally store the plurality of images for later retrieval and/or later analysis.

In some implementations, the trap system controller may perform a processing of the plurality of images (e.g., before transmitting or storing the images). For example, the trap system controller may process a plurality of images received from one or more image capture devices to identify a particular insect specimen from a plurality of insect specimens on or within the trap mechanism. More specifically, the trap system controller may identify a same insect specimen within each of the plurality of images by determining a location of the insect specimen relative to the trap mechanism In some implementations, the location of the insect mechanism may be determined based on coordinates and/or a position of the one or more mechanical devices at the time the respective images were captured. For example, using triangulation and/or one or more analyses, the insect specimen can be located on the trap mechanism and corresponding coordinates of the location of the insect specimen on the trap mechanism can be applied to the various images of the plurality of images. In this way, the trap system controller may identify representations of the insect specimen in each of the plurality of images (e.g., using a digital image processing technique, a computer vision technique, and/or the like) based on respective configurations of the one or more mechanical devices when each of the plurality of images was captured.

In some implementations, the trap system controller may perform a digital image processing of the plurality of images to enhance the representations of the insect specimen and/or generate one or more enhanced representations of the insect specimen. For example, the trap system controller may process (e.g., edit, zoom, crop, brighten, adjust contrast, and/or the like) the plurality of images to generate an enhanced representation of the insect specimen (e.g., such as a three-dimensional representation) using one or more image processing models. Accordingly, the trap system controller can provide one or more enhanced representations of the insect specimen to a server device for further analysis.

The trap system controller may sort and/or organize the plurality of captured images. For example, the trap system controller may sort and/or organize the plurality of images according to each insect specimen of the plurality of insect specimens on or within the trap mechanism In such cases, the trap system controller may assign an identifier to the insect specimen and map the plurality of images and/or other information associated with the insect specimen (e.g., date/time information, trap location information, and/or the like) associated with the insect specimen using the identifier and the location of the insect specimen. In this way, the plurality of images may be configured into a structured data set (which can later be analyzed and/or provided to a server device for analysis). In this way, the trap system controller may distinguish each insect specimen from other insect specimens of the plurality of insect specimens and aggregate the representations into the enhanced representation based on the representations being associated with the first insect specimen.

Accordingly, the insect trap analysis system of example implementation 100 may enable real-time, remote surveillance of insect specimens within insect traps. Furthermore, the insect trap analysis system may include one or more components that can generate a set of images of insect specimens, a preprocessed set of images, and/or enhanced representations of an insect specimen to permit a server device to more accurately analyze the insect specimen.

As indicated above, FIG. 1 is provided merely as one or more examples. Other examples may differ from what is described with regard to FIG. 1.

Figure 2:
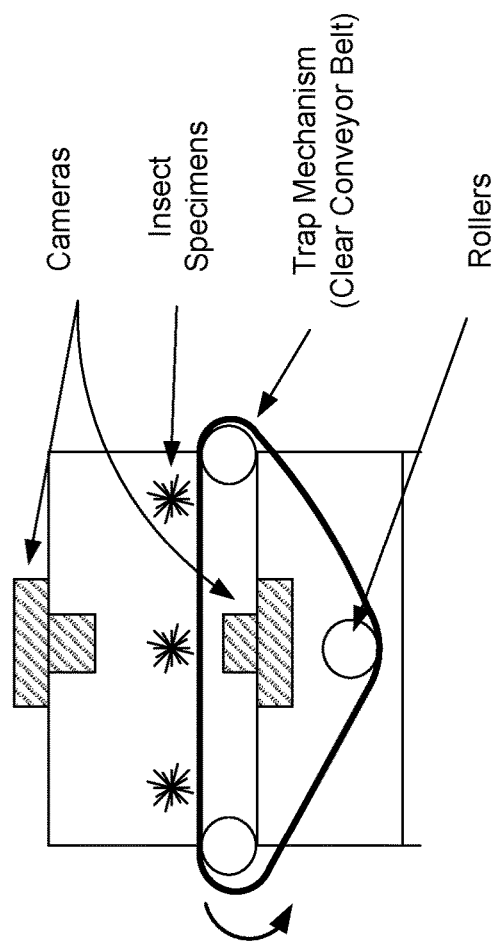
FIGS. 2-4 are diagrams of one or more example specimen analysis systems described herein.

FIG. 2 is a diagram of an example trap system 200 described herein. Trap system 200 may be utilized in the insect trap analysis system of example implementation 100. Trap system 200 includes a clear conveyor belt as a trap mechanism and a pair of cameras to capture images of insect specimens. The clear conveyor belt may include an adhesive conveyor belt that traps insects and/or holds insect specimens to the conveyor belt (at least when the insect specimens are between the cameras). For example, the clear conveyor belt may include an adhesive, such as glue, that prevents insects from escaping the clear conveyor belt.

As shown, the conveyor belt is formed in a loop. The clear conveyor belt may be configured to rotate around the loop by one or more rollers. The one or more rollers may be controlled by a trap system controller using a motor or other type of electromechanical device. As shown, the pair of cameras may be situated opposite one another, such that a first camera captures a top side of the clear conveyor belt and a second camera captures a bottom side of the conveyor belt. Accordingly, the cameras may be configured to coaxially capture images 180 degrees from each other. This way, the cameras may capture images of insect specimens that provide opposite views (a coaxial 180 degrees difference) of the insect specimens on the clear conveyor belt.

In some implementations, the trap system may include a cleaning mechanism capable of removing or scraping the insect specimens from the clear conveyor belt. In this way, the conveyor belt can be repeatedly rotated and/or reused after insect specimens have been removed without requiring manual maintenance or removal of the insect specimens. Additionally, or alternatively, the clear conveyor belt may be configured as a scroll format that is wrapped around a pair of end rollers. In such cases, a first end of the scroll may be new or clean (does not include any capture specimens) and the second end may be used or include any insect specimens captured during rotations of the end rollers. The clear conveyor belt can be transferred from the first end roller to the second end roller to ensure that the clear conveyor belt remains relatively clean when scrolling past the pair of cameras, so that more adhesive surface is available to capture insects and/or that image processing is simplified (fewer insect specimens may be included within each image captured by the cameras because the clear conveyor belt is less densely populated with insect specimens.

As indicated above, FIG. 2 is provided merely as one or more examples. Other examples may differ from what is described with regard to FIG. 2.

Figure 3:
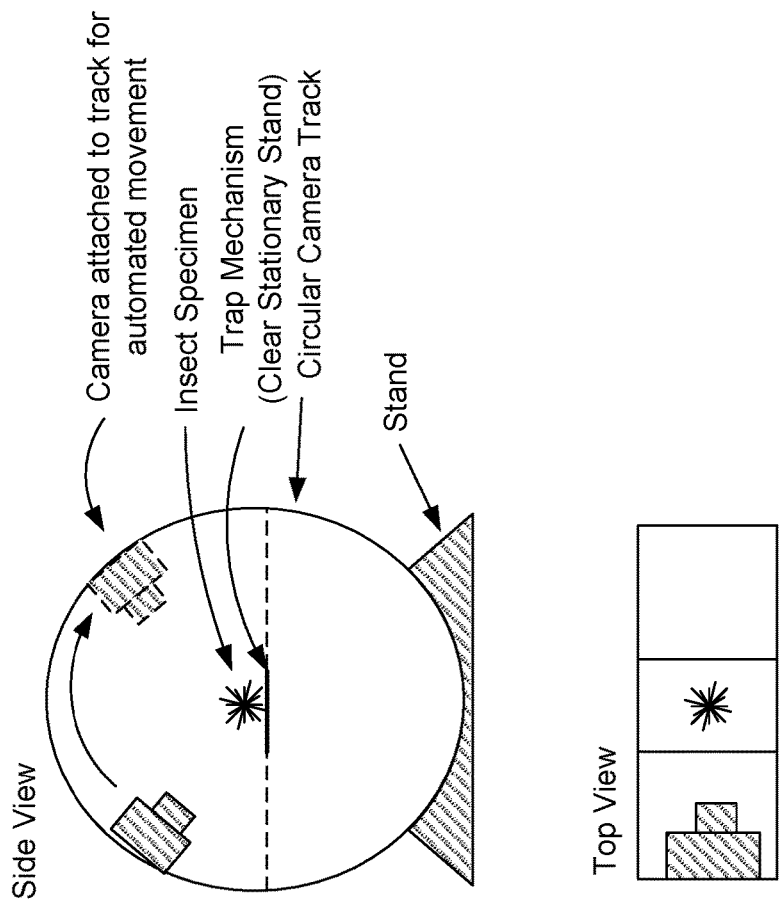

FIG. 3 is a diagram of an example trap system 300 described herein. Trap system 300 may be utilized in the insect trap analysis system of example implementation 100. Trap system 300 includes a clear stationary stand as a trap mechanism and a camera configured to rotate about the clear stationary stand. The clear stationary stand may include an adhesive to trap insects and/or hold insect specimens on the clear stationary stand.

The camera may be configured to rotate about the clear stationary stand on a track. Accordingly, the position of the camera on the track can be controlled by a trap system controller using a motor or other type of electromechanical device. In this way, the trap system controller can use the camera to capture images of the insect specimen from a plurality of different angles.

As indicated above, FIG. 3 is provided merely as one or more examples. Other examples may differ from what is described with regard to FIG. 3.

Figure 4:
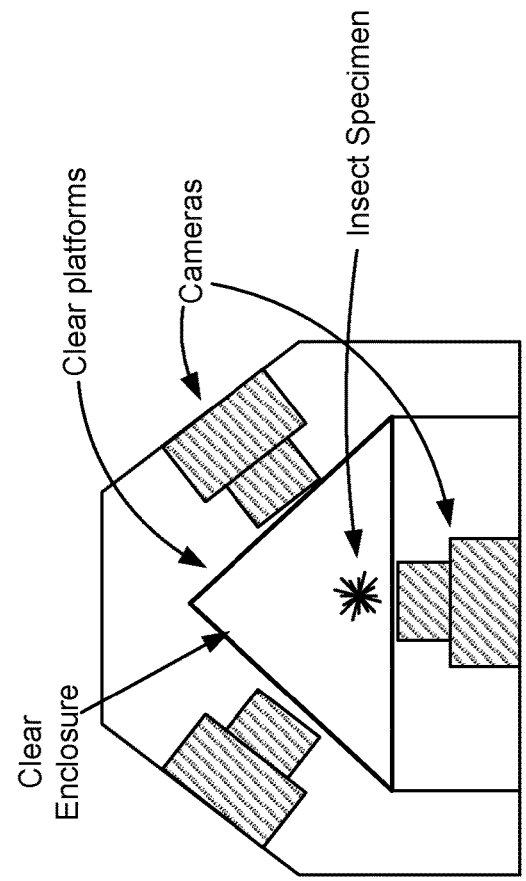

FIG. 4 is a diagram of an example trap system 400 described herein. Trap system 400 may be utilized in the insect trap analysis system of example implementation 100. Trap system 400 includes a plurality of cameras and a clear enclosure as a trap mechanism The clear enclosure may be configured to relatively easily enable insects to enter the clear enclosure, but relatively difficult to allow the insects to escape the clear enclosure. Accordingly, the clear enclosure may not utilize an adhesive.

As shown, the plurality of cameras may be configured about the clear enclosure to permit the capture of a plurality of images of the insect specimen from a plurality of different angles, as described herein. In some implementations, one or more of the plurality of cameras may be connected to one or more mechanical devices to permit the trap system controller to move the one or more cameras and enable each of the cameras to capture images of the insect specimen from different angles. Furthermore, one of the plurality of cameras may be stationary (e.g., attached to a stand of trap system 400).

As indicated above, FIG. 4 is provided merely as one or more examples. Other examples may differ from what is described with regard to FIG. 4.

Figure 5:
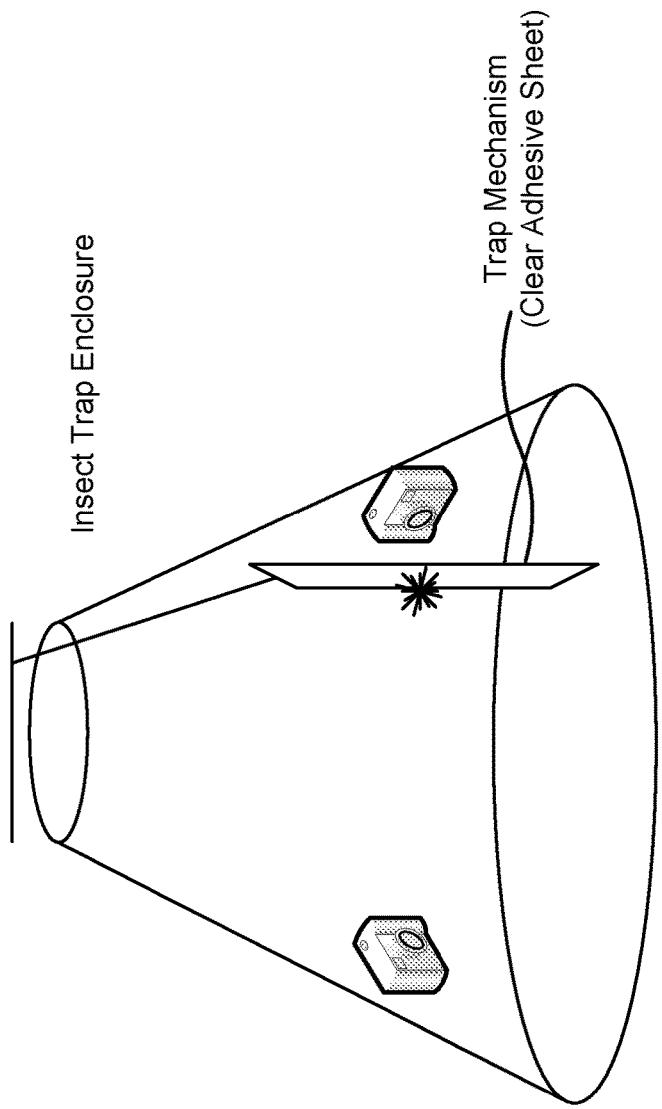
FIG. 5 is a diagram of an example implementation of a trap mechanism in combination with an insect trap enclosure described herein.

FIG. 5 is a diagram of an example implementation 500 of a trap mechanism in combination with an insect trap enclosure described herein. The insect trap enclosure and/or trap mechanism may be associated with and/or utilized within one or more of the insect trap analysis systems described herein. As shown, the trap mechanism may be a clear adhesive sheet (e.g., a piece of adhesive tape, a clear sheet of plastic, and/or the like). In example implementation 500, a plurality of cameras may be situated proximate the trap mechanism to ensure that images captured by the camera are a threshold resolution.

In some instances, the longer an insect is within an enclosure, such as the insect trap enclosure of example implementation 500, the less healthy the insect becomes. For example, the insects may become less healthy due to low air quality (e.g., caused by decay of insect specimens, stale air, and/or the like) of the insect trap enclosure. Accordingly, the insect trap enclosure may be configured to be a size (e.g., that corresponds to a size of the trap mechanism) that ensures insects are funneled toward the trap mechanism, increasing the likelihood that the insects are captured by the trap mechanism more quickly, and/or are less likely to die before being captured. Furthermore, the insect trap enclosure and trap mechanism combination may enable captured insects to be in a more healthy state (which may provide a more accurate indication of a state of a species of the insect specimen) than if the insects are trapped after a relatively extended duration of being within the trap enclosure.

As indicated above, FIG. 5 is provided merely as one or more examples. Other examples may differ from what is described with regard to FIG. 5.

According to some implementations described herein, a mobile device enables remote analysis of an insect specimen and/or a collection of insect specimens using one or more images of the insect specimen or collection of insect specimens. For example, the mobile device may obtain an image of an insect specimen, determine a characteristic of the insect specimen based on the image, obtain specimen information associated with the insect specimen based on a location of the mobile device, determine a real-time status of the location based on the specimen information (e.g., using a model, such as a machine learning model), and perform one or more actions based on the analysis. In some implementations, the action may include alerting a user that the status of the location is unsafe (or potentially unsafe) based on the analysis of the specimen information, activating a mitigation device at the location (e.g., to mitigate a threat associated with an insect population associated with the insect specimen), and/or reporting the real-time status of the location to a server device (e.g., a centralized server to monitor a region of the location). In this way, the mobile device may enable remote, on-site, and/or real-time analysis of an insect specimen to determine a status of a particular location relative to an insect population associated with the insect specimen.

Figure 6A:
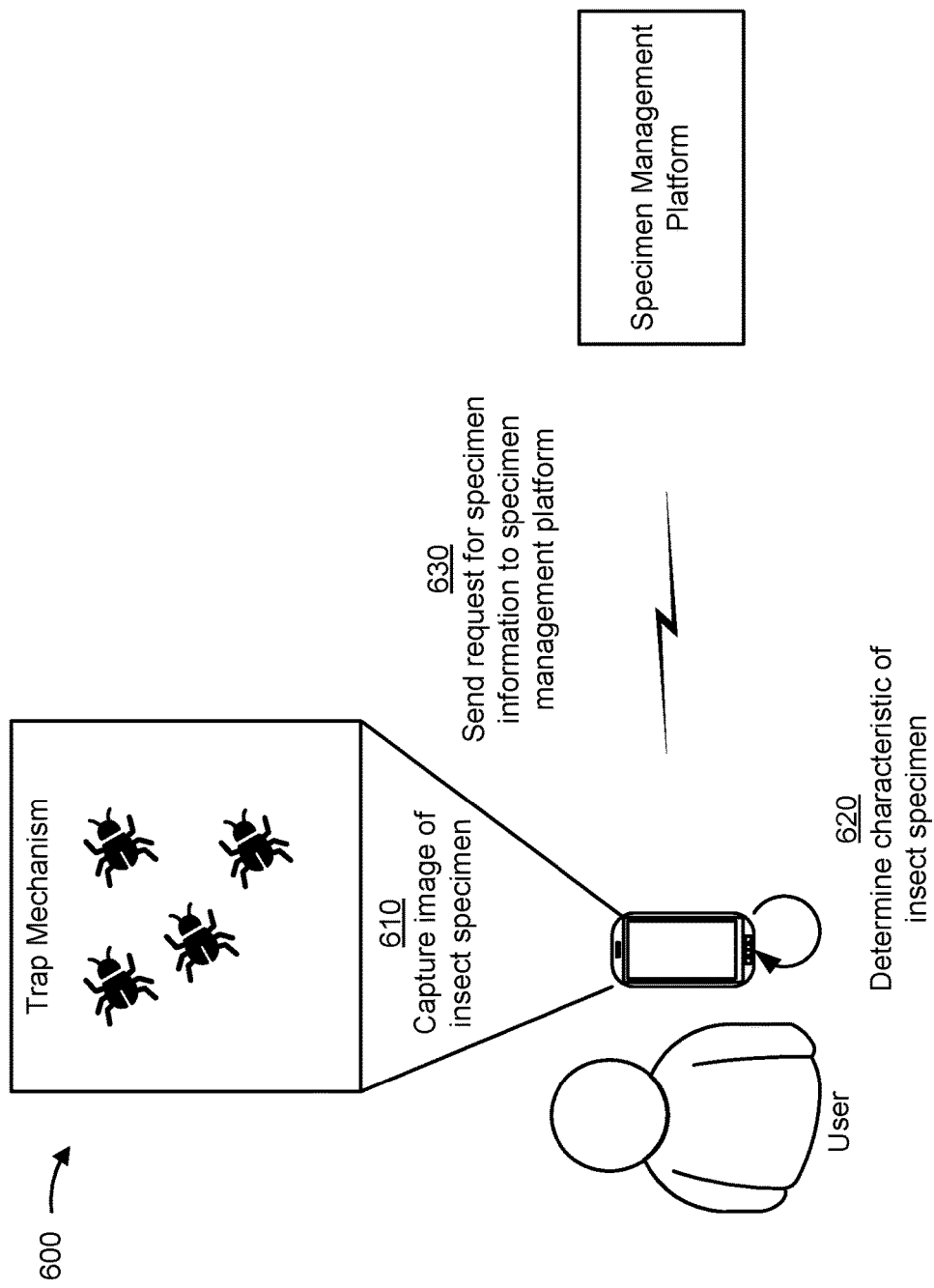
Figure 6B:
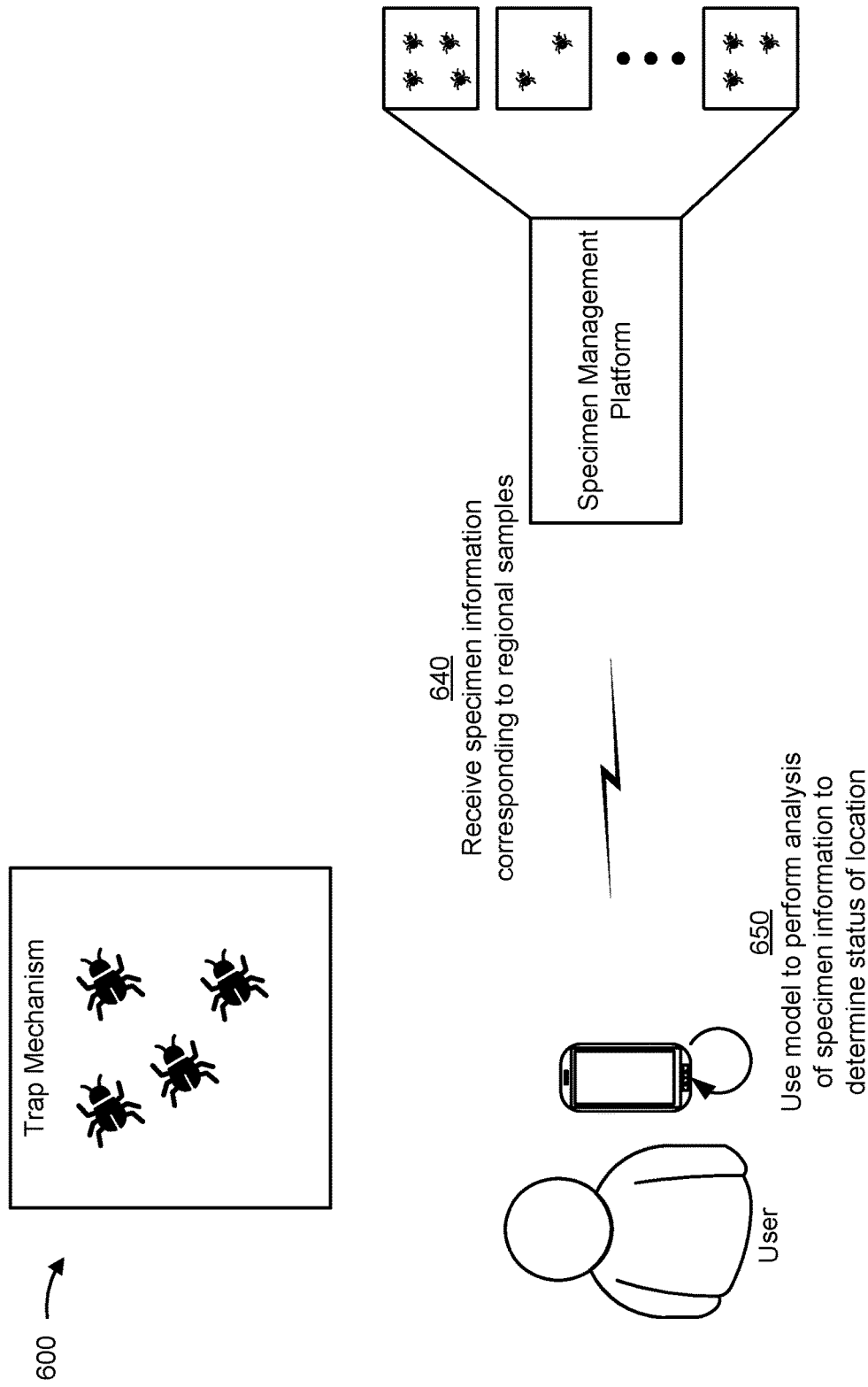

FIGS. 6A-6C are diagrams of one or more example implementations 600 described herein. Example implementation(s) 600 may include a mobile device (which may correspond to the trap system controller in one or more of the examples described above), a trap mechanism, and a specimen management platform. As described herein, the mobile device may capture an image of one or more insect specimens, provide characteristic information associated with an insect specimen to the specimen management platform, receive specimen information (e.g., associated with a region of the location of the trap mechanism) from the specimen management platform, and determine a status of a location of the trap mechanism and/or mobile device based on the specimen information.

As shown in FIG. 6A, and by reference number 610, the mobile device may capture an image of an insect specimen. For example, the mobile device may use a camera of the mobile device to capture one or more images of the insect specimen and/or a collection of insect specimens (e.g., a group of insect specimens that are in an insect trap). In some implementations, the mobile device may capture an image of a collection of insect specimens.

In some implementations, the mobile device may capture the image of the collection of insect specimens based on a user input (e.g., a user clicking a "capture image" button of an application of the mobile device). In some implementations, the mobile device may capture a plurality of images of an insect specimen. In such cases, the mobile device may sort and/or organize the plurality of captured images. For example, the mobile device may sort and/or organize the plurality of images according to each insect specimen of a plurality of insect specimens on or within the trap mechanism. In such cases, the mobile device may assign an identifier to an insect specimen and map the plurality of images and/or other information associated with the insect specimen (e.g., date and/or time information, trap location information, and/or the like) associated with the insect specimen using the identifier and the location of the insect specimen. In this way, the plurality of images may be configured into a structured data set (which can later be analyzed and/or provided to a server device for analysis). In this way, the mobile device may distinguish each insect specimen from other insect specimens of the plurality of insect specimens and aggregate representations to permit the mobile device to more accurately determine a characteristic of the insect specimen.

According to some implementations, the mobile device may control one or more components of the trap mechanism (e.g., cameras, mechanical devices, and/or the like) to capture and/or obtain the images of the insect specimen. For example, the mobile device may control the one or more components of the trap mechanism according to a user input and/or a request from the specimen management platform.

In this way, the mobile device may obtain the image of the collection of insect specimens to permit the mobile device to determine a characteristic (e.g., a genus, species, gender, and/or the like) of the insect specimen.

As further shown in FIG. 6A, and by reference number 620, the mobile device may determine a characteristic of the insect specimen. For example, the mobile device may determine the characteristic of the insect specimen based on an analysis of the image. For example, the mobile device may perform an image processing analysis using a model to detect the characteristic of the insect specimen. Additionally, or alternatively, the mobile device may determine the characteristic of the insect specimen using one or more sensors (e.g., a light sensor or infrared sensor) of the mobile device.

As described herein, the characteristic may include one or more of genus, species, gender, whether the insect specimen is/was sterile, whether the insect specimen is/was modified (e.g., biologically or genetically) or mutated, whether the insect specimen is associated with a particular disease (e.g., has or had a disease, transmits a disease), and/or the like.

In some implementations, the mobile device is configured to detect particular levels of fluorescence emitted from an insect specimen (e.g., a mosquito specimen). Such fluorescence may be incited by a particular wavelength of light from a light source. The example light source may be associated with the mobile device (e.g., a flash device of the mobile device) and/or an insect trap associated with the specimen. Additionally, or alternatively, the fluorescence may be caused by a fluorescent dust on the insect specimen, a fluorescent food that may have been ingested by the insect, and/or bacteria emitting radiation or light from within a transparent segment of the insect. Certain levels of the fluorescence may correspond to a particular species of the insect specimen (e.g., which may be naturally evolved insect specimens or genetically modified insect specimens). In some implementations, the certain levels of fluorescence may indicate one or more other characteristics of the insect specimen, such as whether the insect specimen has been modified in any particular way (e.g., to be a particular gender, to be sterile, and/or the like). Accordingly, a level of fluorescence associated with the insect specimen can be identified in the image. Based on the level of fluorescence, the mobile device may identify the genus, species, and/or gender of the insect and/or other characteristics of the insect specimen (e.g., source, modifications, diseases associated with the insect specimen, and/or the like) using a mapping of signals from the one or more sensors to corresponding characteristics.

In some implementations, the mobile device (and/or an application of the mobile device) may use a machine learning model to determine one or more characteristics of the insect specimen. For example, the mobile device may train the machine learning model based on one or more parameters associated with determining a characteristic of an insect specimen, such as a location of the mobile device, a type of the characteristic (e.g., whether genus, species, gender, size, and/or the like), one or more features of the insect specimen (e.g., shapes, colors, sizes, presence of fluorescence, and/or the like), one or more characteristics of the images of the insect specimen (e.g., resolution, clarity, contrast, brightness, formatting, and/or the like), one or more characteristics of a trap associated with the insect specimen (e.g., size, shape, type, and/or the like), and/or the like. The mobile device (and/or one or more other devices, such as the specimen management platform) may train the machine learning model, according to the one or more parameters, using historical data associated with determining characteristics of insect specimens. Using the historical data and the one or more parameters as inputs to the machine learning model, the machine learning model may determine the characteristic of the insect specimen to permit the mobile device to request specimen information for specimens associated with the identified characteristic (or sets of characteristics).

In this way, the mobile device may determine a characteristic of the insect specimen so that the mobile device can provide the characteristic to a specimen management platform to receive specimen information associated with the insect specimen.

As further shown in FIG. 6A, and by reference number 630, the mobile device may send a request for specimen information to the specimen management platform. In some implementations, the request may include location information and/or information identifying the characteristic of the specimen. The request may prompt the specimen management platform to provide specimen information to the mobile device. The specimen information may correspond to regional specimen information that provides information associated with insects in the region that have the characteristic identified and/or provided to the specimen management platform. In some implementations, the specimen information may include more detailed information about an insect corresponding to the insect specimen. For example, the more detailed information may include particular traits and/or trends (e.g., recent trends) associated with the insect, such as whether an insect population is increasing or decreasing, becoming more or less hazardous, causing more or less damage, causing more or less health concerns, moving in a particular direction, and/or the like. In such cases, such information may not be accessible to the mobile device and/or made available to the mobile device without the mobile device providing the characteristic and/or request for the specimen information.

In this way, the mobile device may send a request for specimen information to obtain the specimen information from the specimen management platform.

As shown in FIG. 6B, and by reference number 640, the mobile device receives the specimen information from the specimen management platform. The specimen management platform may be any suitable platform configured to receive, store, process, and/or provide specimen information associated with one or more regions of a location of the mobile device. As described herein, a region of a location may correspond to an area that is within a threshold range (e.g., within 100 meters (m), within 1 kilometer (km), within 10 km, within 50 km, and/or the like) of the location, or a particular perimeter that includes the location (e.g., within a certain jurisdiction, real estate property, and/or the like). In this way, the mobile device may receive the specimen information to permit the mobile device to determine a real-time status of the location based on the specimen information.

In some implementations, the mobile device is remote from the specimen management platform. For example, the specimen management platform may be a server device of a centralized location of a region or a server device of a cloud environment. In some implementations, the request for the specimen information may be sent and the specimen information may be received from a location associated with the trap device so that the mobile device can be used (e.g., by a user) to determine a real-time status of the location, relative to the insect specimen. The server device may be configured to monitor and/or be associated with a plurality of insect traps, mobile devices, and/or the like to track and/or analyze insect specimens and/or corresponding insect populations.

As further shown in FIG. 6B, and by reference number 650, the mobile device uses a model to perform an analysis of the specimen information to determine a real-time status of the location of the mobile device and/or the location of the trap mechanism. The real-time status may correspond to a threat level associated with the insect specimen (e.g., a level that indicates whether an insect population associated with the insect specimen poses a threat to the location). In some implementations, the model may be associated with an application of the mobile device (e.g., an application configured to monitor, track, process, and/or determine information associated with insect specimens and/or corresponding insect populations). The model may use one or more techniques to calculate a score that corresponds to the real-time status of the location. For example, specimen information that indicates that an insect population is relatively high near the location, increasing around the location, or moving toward the location may result in a relatively high score, indicating that the real-time status of the location is potentially hazardous. Various other information in the specimen information (e.g., probability of an insect population carrying a disease, probability of an insect population spreading, and/or the like) may be used to calculate the score and/or determine the real-time status of the location.

In some implementations, the model may be a machine learning model used to analyze the specimen information. For example, the mobile device may train the machine learning model based on one or more parameters associated with analyzing specimen information from the specimen management platform and/or one or more other specimen management platforms. Such parameters may include location information, characteristics of the specimen, trend information associated with the insect specimen, and/or the like. The mobile device (and/or one or more other devices, such as the specimen management platform) may train the machine learning model, according to the one or more parameters, using historical data associated with analyzing the specimen information. Using the historical data and the one or more parameters as inputs to the machine learning model, the mobile device may determine a real-time status associated with the location relative to the insect specimen to determine whether one or more actions are to be performed based on the real-time status.

In this way, the mobile device may determine (e.g., using a model) a real-time status of the location of the mobile device and/or the trap mechanism based on an analysis of the specimen information to permit the mobile device to perform an action associated with the insect specimen and/or real-time status.

As shown in FIG. 6C, the mobile device may perform one or more actions. As shown by reference number 660*a*, the mobile device may indicate a status of the location of the mobile device based on the determined real-time status. For example, the mobile device may indicate whether the location (or region of the location) is safe (shown by the checkmark) or hazardous (shown by the warning signal). In some implementations, the mobile device may provide information associated with the status, such as a score representative of the status of the location. The score may be for a safety scale, a scale indicating a characteristic associated with the insect specimen (e.g., a population scale, and/or the like), and/or the like.

As further shown in FIG. 6C, and by reference number 660*b*, the mobile device may activate a threat mitigation device. For example, the mobile device may send a message to one or more remotely controlled mitigation devices (e.g., pesticide sprayers, automated vehicles, and/or the like) that can be utilized to subdue (or at least decrease) a threat from an insect population that is associated with the insect specimen. In such cases, the mobile device may active the threat mitigation device based on a score associated with the real-time status satisfying a particular threshold.

As further shown in FIG. 6C, and by reference number 660*c*, the mobile device may provide the status information to the specimen management platform. For example, the mobile device may indicate whether there is a threat to the location or whether the location is safe/normal. Accordingly, the specimen management platform can log information associated with the location (along with a plurality of other locations in a region including the location). Such logged information may be utilized to generate and/or provide specimen information to the mobile device in the future and/or to one or more other devices.

In this way, the mobile device may perform one or more actions associated with the specimen information.

As indicated above, FIGS. 6A-6C are provided merely as one or more examples. Other examples may differ from what is described with regard to FIGS. 6A-6C.

FIGS. 7A-7D are diagrams of an example implementation 700 of one or more user interfaces for a mobile device described herein. The user interface(s) may be user interface(s) of an application installed on the mobile device. The application may be configured with a model that performs real-time analysis of images of an insect specimen or a collection of insect specimens.

Figure 7A:
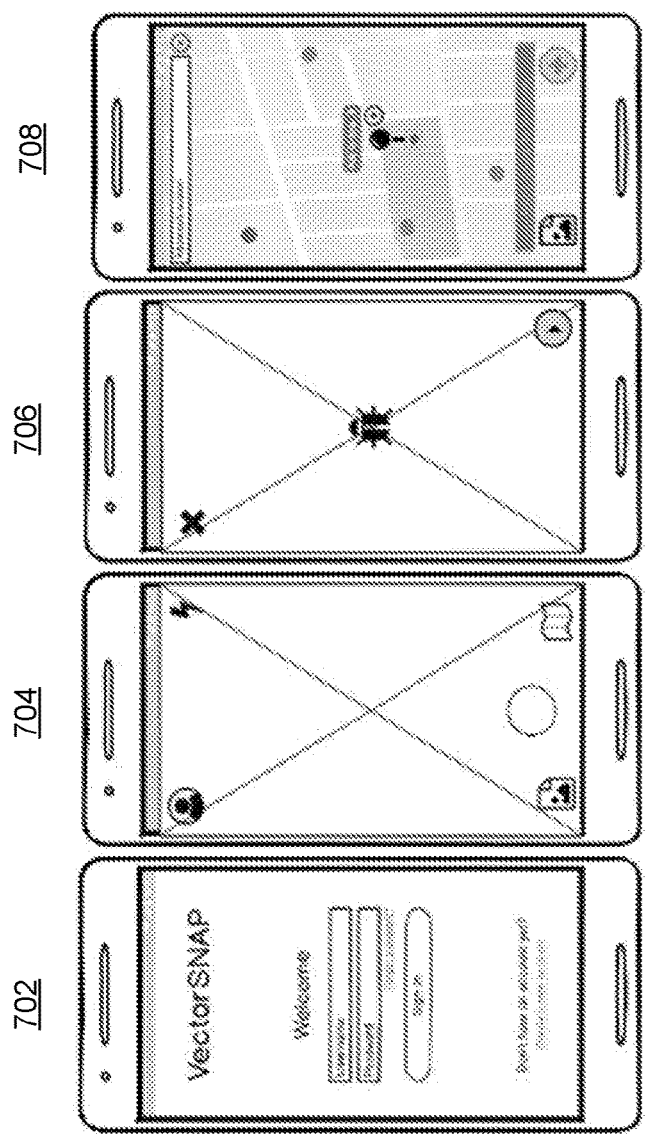
FIGS. 7A-7D are diagrams of example implementations of a user interface for a mobile device described herein.

As shown in FIG. 7A, and by reference number 702, the user interface may include a user sign-in prompt to permit a user to access the application via the mobile device. As shown by reference number 704, the user interface of the application may include a home page with a plurality of icons to access corresponding functions of the application. Such functions may include image capture (e.g., to capture images), image review (e.g., to access captured images), map mode (e.g., to display traps and/or specimen information on a map), user profile access (e.g., to enable access to user information and/or activity associated with the application), and/or the like. As shown by reference number 706, an image capture interface of the user interface may include indicators to facilitate navigation or capture of an insect specimen (e.g., using crosshairs). As shown by reference number 708, the user interface may enable information identifying the insect specimen to be added to an existing trap and/or location on a map.

Figure 7B:
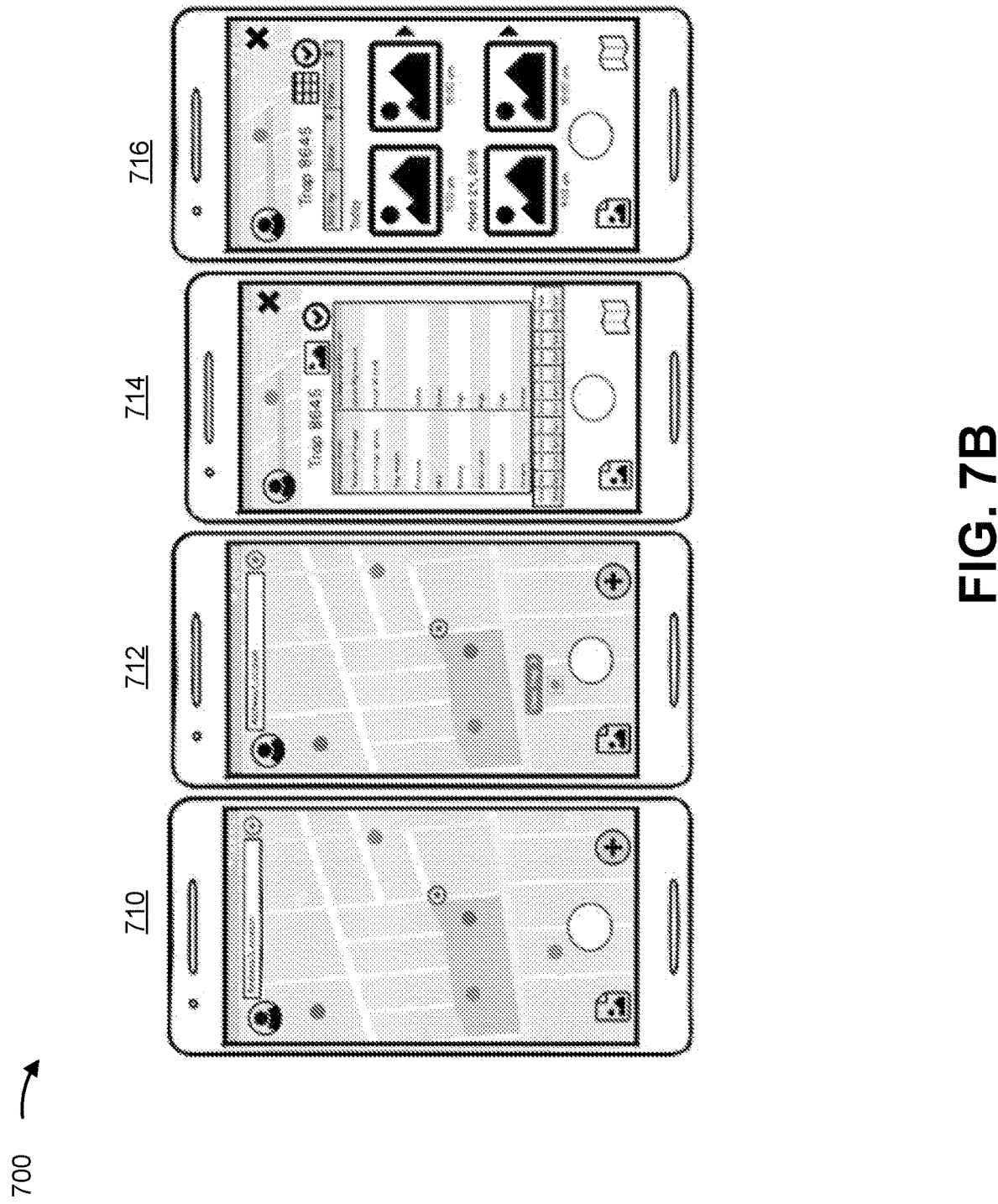

As shown in FIG. 7B, and by reference number 710, a map display of the user interface may indicate traps and/or insect specimens in relation to a user's most recently registered location (e.g., according to global positioning system (GPS) coordinates) and/or a current location of the mobile device. As shown by reference number 712, the user interface enables traps and/or locations to be selected for more information. As shown by reference number 714, a user interface for a view of individual trap or location information includes geographic information (e.g., coordinates), identification information, maintenance information (e.g., schedules, most recently received maintenance, and/or the like), and/or a current image capture schedule. As shown by reference number 716, the user interface enables toggling from trap information to most recent images captured by the trap.

Figure 7C:
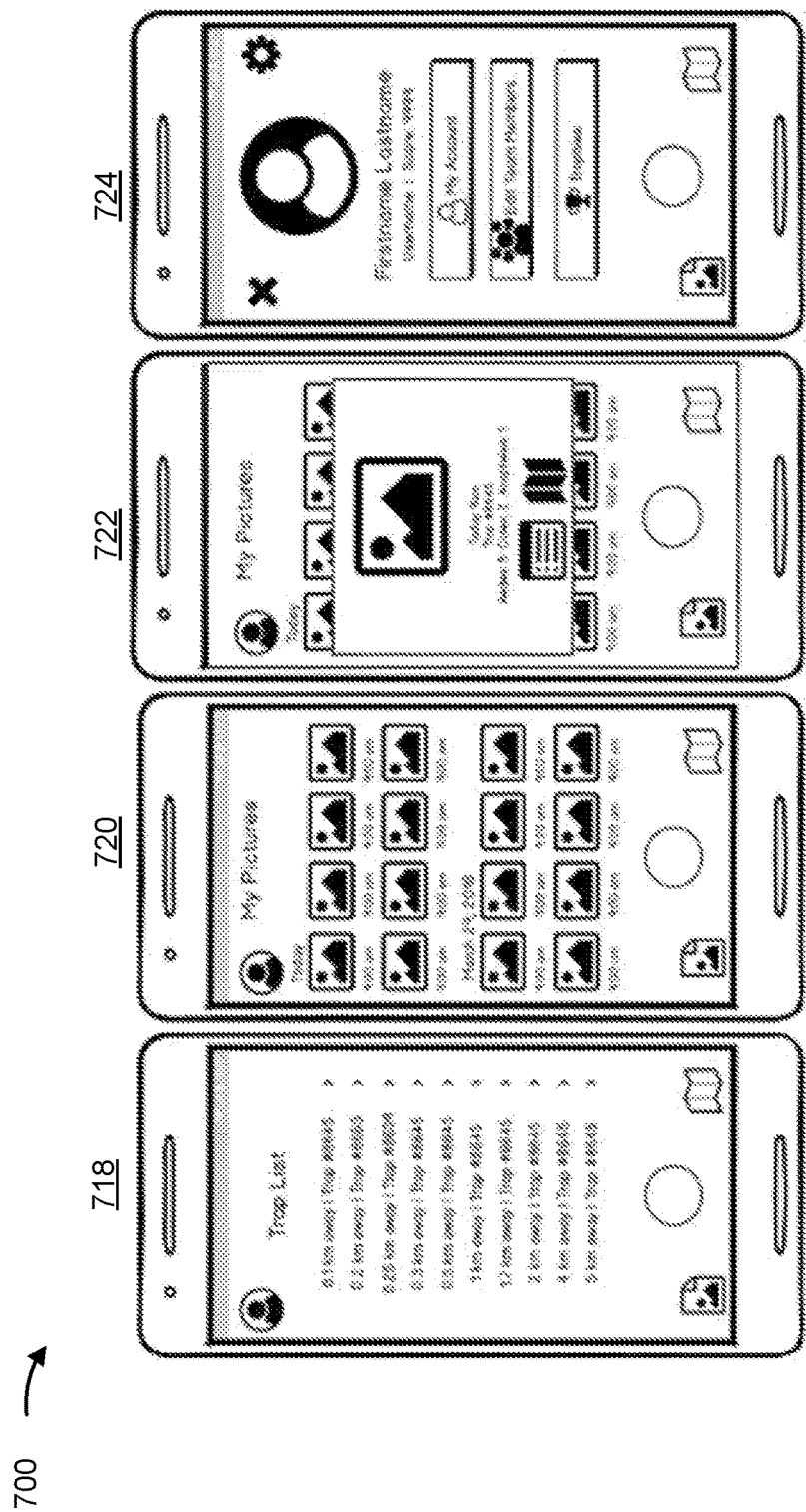

As shown in FIG. 7C, and by reference number 718, the user interface enables a view to identify nearest insect traps in a list format. As shown by reference number 720, the user interface enables display of most recent images captured by the user. As shown by reference number 722, the user interface enables a zoomed or enhanced view of additional information associated with the image (e.g., location, time captured, insect specimen captured, characteristic of insect specimen, and/or the like). As shown by reference number 724, the user interface can display an administrative profile of a user associated with the mobile device.

Figure 7D:
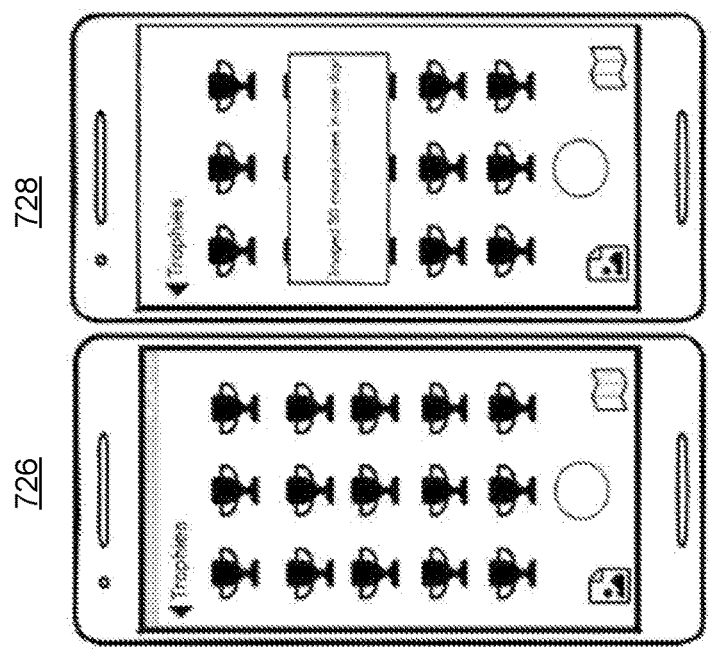

As shown in FIG. 7D, and by reference number 726, the user interface can display rewards (shown as trophies) associated with a user performing one or more tasks (e.g., capturing images of insect specimens, capturing images of different insect specimens with various characteristics (e.g., different types of species of insect specimens), providing information associated with insect specimens, and/or the like). These rewards can serve to encourage users to perform the one or more tasks, which can result in improving the operation of the specimen management platform. As shown by reference number 728, information associated with the reward can provide an explanation for receiving the reward.

As indicated above, FIGS. 7A-7D are provided merely as one or more examples. Other examples may differ from what is described with regard to FIGS. 7A-7D.

Figure 8:
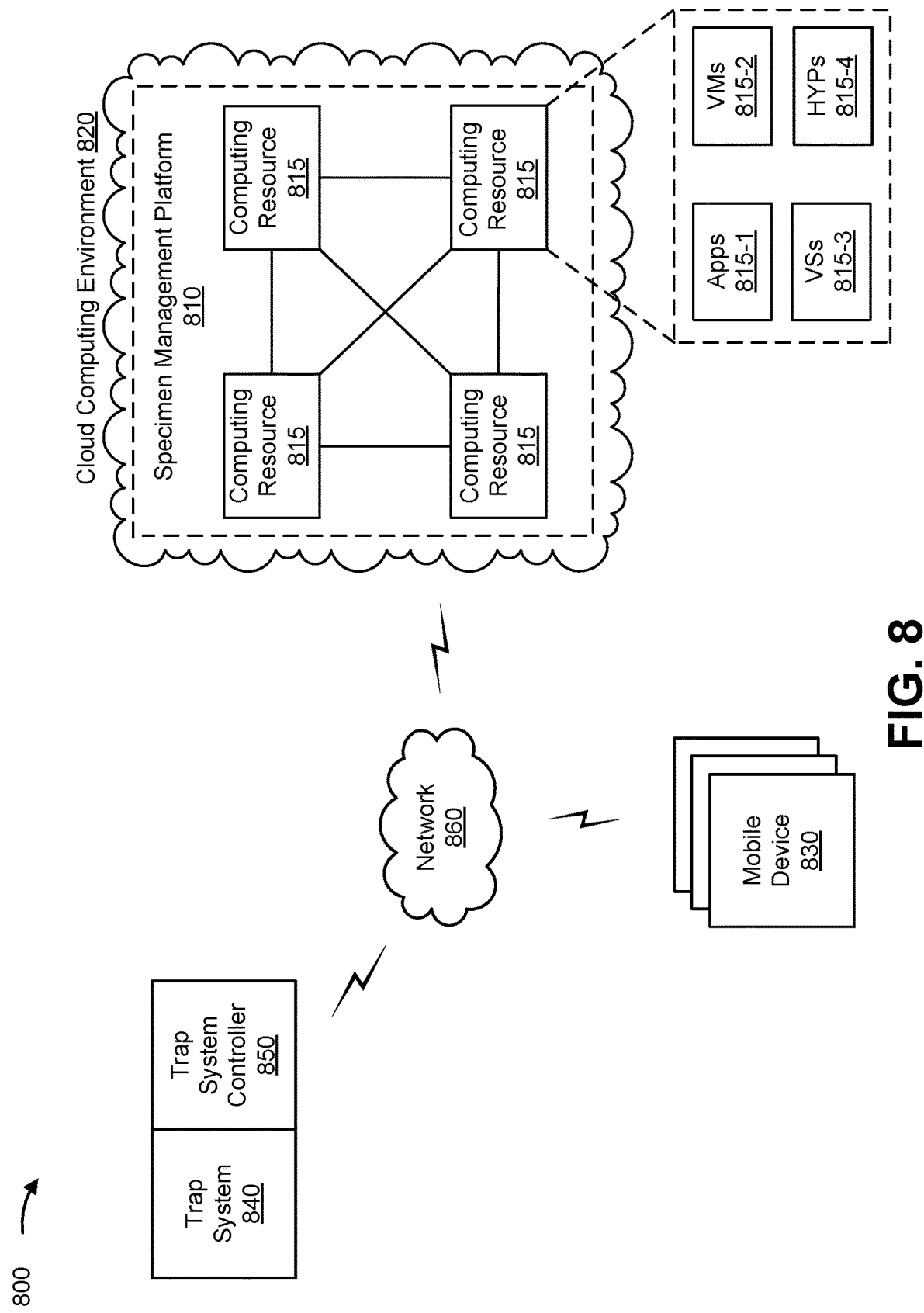
FIG. 8 is a diagram of an example environment in which systems and/or methods described herein may be implemented.

FIG. 8 is a diagram of an example environment 800 in which systems and/or methods described herein may be implemented. As shown in FIG. 8, environment 800 may include a specimen management platform 810, a computing resource 815 of a cloud computing environment 820, one or more mobile devices 830 (referred herein individually as "mobile device 830" or collectively as "mobile devices 830"), a trap system 840 with a trap system controller 850, and a network 860. Devices of environment 800 may interconnect via wired connections, wireless connections, or a combination of wired and wireless connections.

Specimen management platform 810 includes one or more devices capable of storing, processing, and/or routing information associated with insect specimens captured by trap system 840 and/or processed by trap system controller 850. In some implementations, specimen management platform 810 may include a communication interface that allows specimen management platform 810 to receive information from and/or transmit information to other devices in environment 800.

Specimen management platform 810 includes one or more computing resources assigned to receive, generate, store, process, and/or providing specimen information, as described herein. For example, specimen management platform 810 may be a platform implemented by cloud computing environment 820 that may receive requests for specimen information from mobile device 830, identify and/or generate corresponding specimen information based on information in the request, and provide the specimen information to mobile device 830. In some implementations, specimen management platform 810 is implemented by computing resources 815 of cloud computing environment 820.

Specimen management platform 810 may include a server device or a group of server devices. In some implementations, specimen management platform 810 may be hosted in cloud computing environment 820. Notably, while implementations described herein describe specimen management platform 810 as being hosted in cloud computing environment 820, in some implementations, specimen management platform 810 may be non-cloud-based or may be partially cloud-based. In some implementations, specimen management platform 810 is associated with a particular region, a particular entity (e.g., an organization that monitors and/or provides information associated with one or more insect populations), and/or the like.

Cloud computing environment 820 includes an environment that delivers computing as a service, whereby shared resources, services, etc. may be provided to mobile devices 830. Cloud computing environment 820 may provide computation, software, data access, storage, and/or other services that do not require end-user knowledge of a physical location and configuration of a system and/or a device that delivers the services. As shown, cloud computing environment 820 may include specimen management platform 810 and a computing resource 815.

Computing resource 815 includes one or more personal computers, workstation computers, server devices, or another type of computation and/or communication device. In some implementations, computing resource 815 may host specimen management platform 810. The cloud resources may include compute instances executing in computing resource 815, storage devices provided in computing resource 815, data transfer devices provided by computing resource 815, etc. In some implementations, computing resource 815 may communicate with other computing resources 815 via wired connections, wireless connections, or a combination of wired and wireless connections.

As further shown in FIG. 8, computing resource 815 may include a group of cloud resources, such as one or more applications ("APPs") 815-1, one or more virtual machines ("VMs") 815-2, virtualized storage ("VSs") 815-3, one or more hypervisors ("HYPs") 815-4, or the like.

Application 815-1 includes one or more software applications that may be provided to or accessed by mobile device 830. Application 815-1 may eliminate a need to install and execute the software applications on mobile device 830. For example, application 815-1 may include software associated with specimen management platform 810 and/or any other software capable of being provided via cloud computing environment 820. In some implementations, one application 815-1 may send/receive information to/from one or more other applications 815-1, via virtual machine 815-2.

Virtual machine 815-2 includes a software implementation of a machine (e.g., a computer) that executes programs like a physical machine. Virtual machine 815-2 may be either a system virtual machine or a process virtual machine, depending upon use and degree of correspondence to any real machine by virtual machine 815-2. A system virtual machine may provide a complete system platform that supports execution of a complete operating system ("OS"). A process virtual machine may execute a single program and may support a single process. In some implementations, virtual machine 815-2 may execute on behalf of a user (e.g., mobile device 830), and may manage infrastructure of cloud computing environment 820, such as data management, synchronization, or long-duration data transfers.

Virtualized storage 815-3 includes one or more storage systems and/or one or more devices that use virtualization techniques within the storage systems or devices of computing resource 815. In some implementations, within the context of a storage system, types of virtualizations may include block virtualization and file virtualization Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 815-4 provides hardware virtualization techniques that allow multiple operating systems (e.g., "guest operating systems") to execute concurrently on a host computer, such as computing resource 815. Hypervisor 815-4 may present a virtual operating platform to the guest operating systems and may manage the execution of the guest operating systems. Multiple instances of a variety of operating systems may share virtualized hardware resources.

Mobile device 830 includes one or more devices capable of receiving, generating, storing, processing, and/or providing information associated with insect specimens, as described herein. For example, mobile device 830 may include a mobile communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), or a similar type of mobile device. In some implementations, mobile device 830 is communicatively coupled with devices of trap system 840 and/or trap system controller 850. Accordingly, mobile device 830 may be capable of storing, processing, and/or communicating information associated with insect specimens captured by trap system 840 and/or processed by trap system controller 850.

Trap system 840 includes any suitable combination of electrical and/or mechanical components to collect insect specimens as described herein. For example, trap system 840 may include one or more motors, one or more actuators, one or more control devices, one or more sensors, one or more image capture devices, and/or the like. Trap system controller 850 may include one or more devices capable of receiving, generating, storing, processing, and/or providing information associated with controlling trap system 840. For example, trap system controller 850 may include a communication device and/or a computing device, such as a computer, a mobile device (e.g., a smartphone, a dedicated mobile trap monitoring device, and/or the like), or a similar type of device. Trap system 840 and trap system controller 850 may be combined to form an insect trap analysis system described herein.

Network 860 includes one or more wired and/or wireless networks. For example, network 860 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 6 are provided as one or more examples. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 800 may perform one or more functions described as being performed by another set of devices of environment 800.

Figure 9:
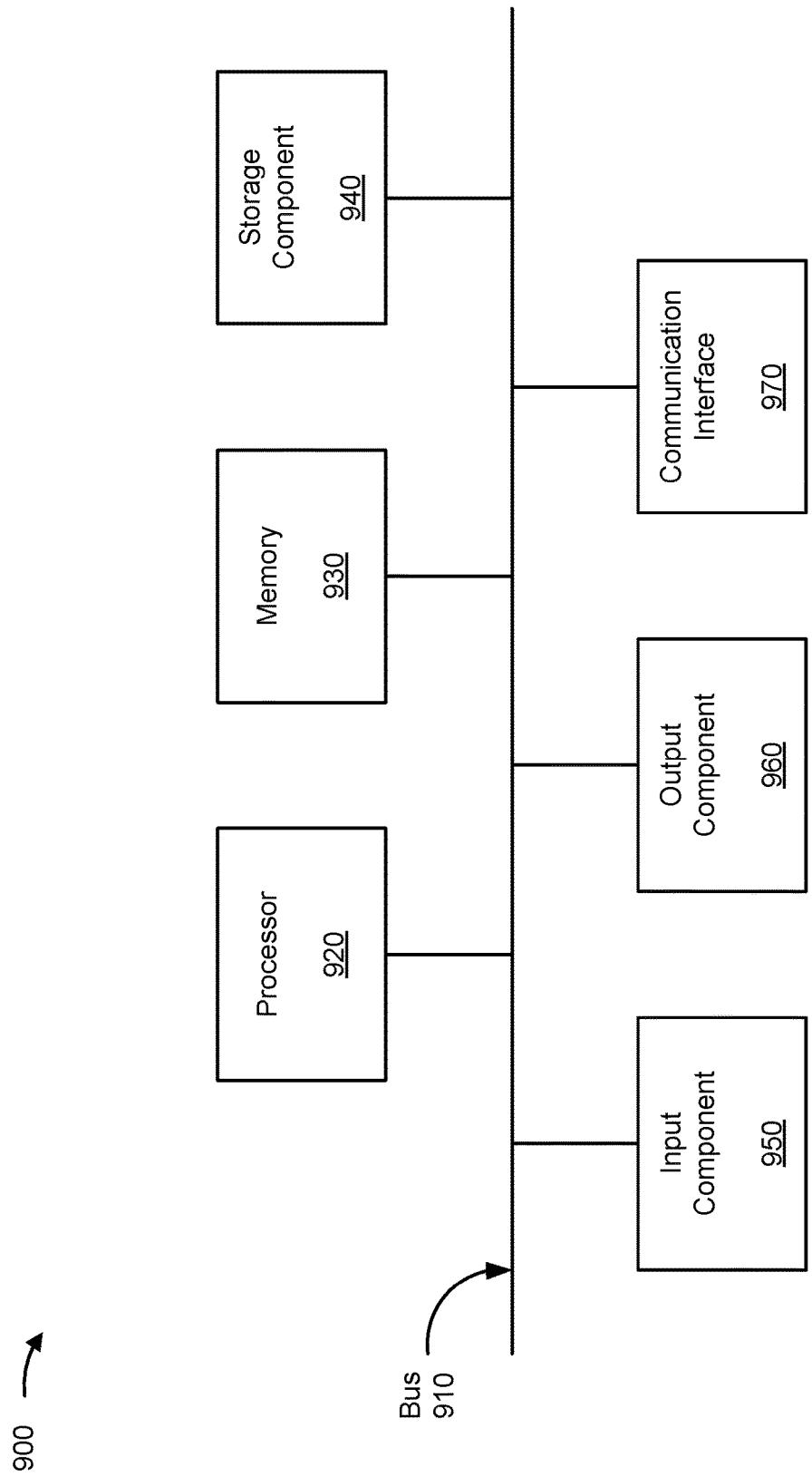
FIG. 9 is a diagram of example components of one or more devices of FIG. 8.

FIG. 9 is a diagram of example components of a device 900. Device 900 may correspond to trap system controller 850 and/or mobile device 830. In some implementations, trap system controller 850 and/or mobile device 830 may include one or more devices 900 and/or one or more components of device 900. As shown in FIG. 9, device 900 may include a bus 910, a processor 920, a memory 930, a storage component 940, an input component 950, an output component 960, and a communication interface 970.

Bus 910 includes a component that permits communication among multiple components of device 900. Processor 920 is implemented in hardware, firmware, and/or a combination of hardware and software. Processor 920 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 includes one or more processors capable of being programmed to perform a function. Memory 930 includes a random-access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 950 includes a component that permits device 900 to receive information, such as via user input (e.g., a touch screen display, a keyboard, a keypad, a mouse, a button, a switch, and/or a microphone). Additionally, or alternatively, input component 950 may include a component for determining location (e.g., a global positioning system (GPS) component) and/or a sensor (e.g., an accelerometer, a gyroscope, an actuator, another type of positional or environmental sensor, and/or the like). Output component 960 includes a component that provides output information from device 900 (via, e.g., a display, a speaker, a haptic feedback component, an audio or visual indicator, and/or the like).

Communication interface 970 includes a transceiver-like component (e.g., a transceiver, a separate receiver, a separate transmitter, and/or the like) that enables device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, and/or the like.

Device 900 may perform one or more processes described herein. Device 900 may perform these processes based on processor 920 executing software instructions stored by a non-transitory computer-readable medium, such as memory 930 and/or storage component 940. As used herein, the term "computer-readable medium" refers to a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

Figure 10:
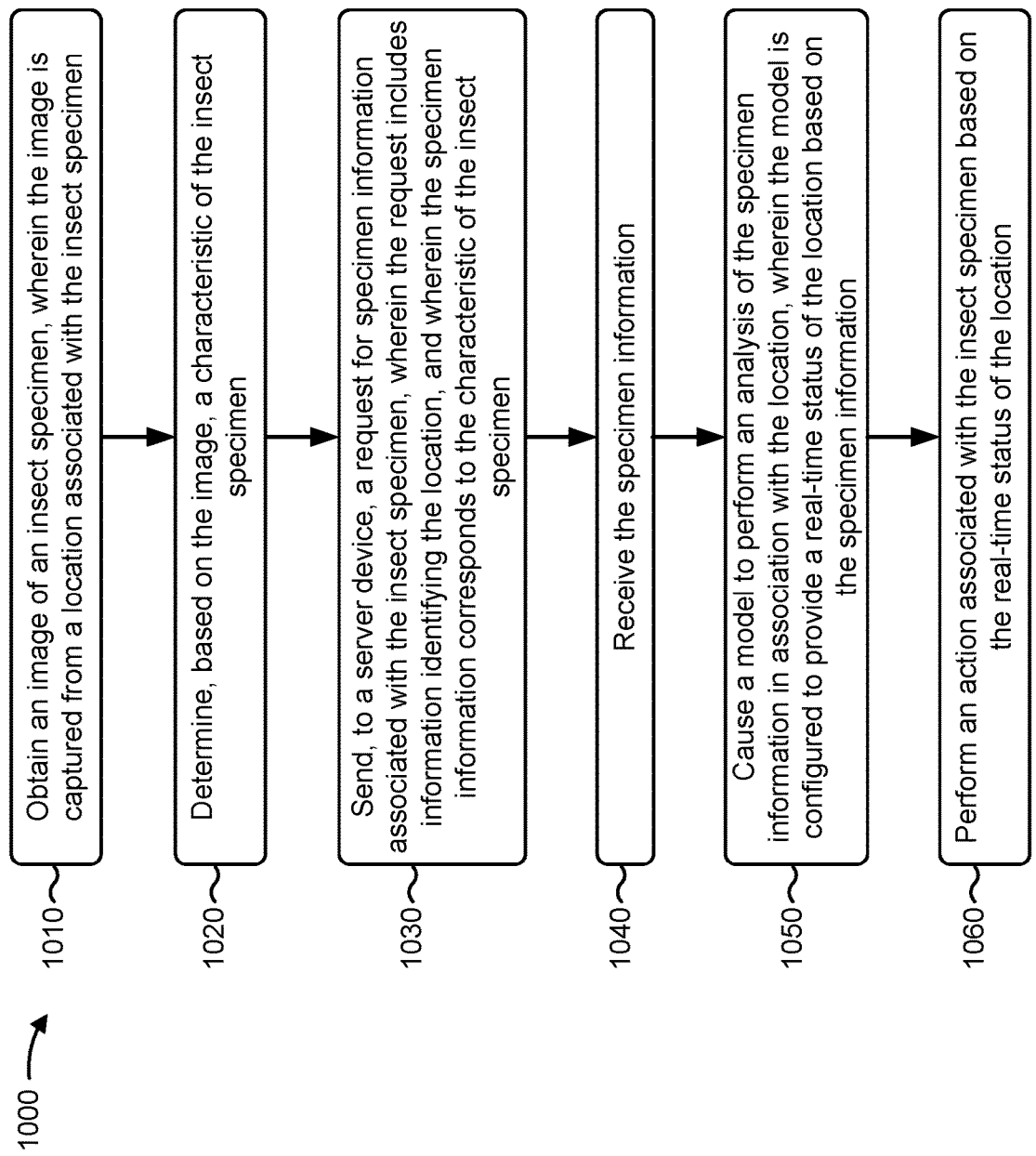
FIGS. 10 and 11 are flowcharts of one or more example processes associated with an insect specimen analysis system described herein.

FIG. 10 is a flowchart of an example process 1000 associated with an insect specimen analysis system described herein. In some implementations, one or more process blocks of FIG. 10 may be performed by a mobile device (e.g., mobile device 830). In some implementations, one or more process blocks of FIG. 10 may be performed by another device or a group of devices separate from or including the mobile device, such as a computing resource (e.g., computing resource 815), a specimen management platform (e.g., specimen management platform 810), and/or the like.

As shown in FIG. 10, process 1000 may include obtaining an image of an insect specimen, wherein the image is captured from a location associated with the insect specimen (block 1010). For example, the mobile device (e.g., using a processor 920, a memory 930, a storage component 940, an input component 950, and a communication interface 970, and/or the like) may obtain an image of an insect specimen, as described above. In some implementations, the image is captured from a location associated with the insect specimen.

As further shown in FIG. 10, process 1000 may include determining, based on the image, a characteristic of the insect specimen (block 1020). For example, the mobile device (e.g., using a processor 920, a memory 930, a storage component 940, an input component 950, and a communication interface 970, and/or the like) may determine, based on the image, a characteristic of the insect specimen, as described above.

As shown in FIG. 10, process 1000 may include sending, to a server device, a request for specimen information associated with the insect specimen, wherein the request includes information identifying the location, and wherein the specimen information corresponds to the characteristic of the insect specimen (block 1030). For example, the mobile device (e.g., using a processor 920, a memory 930, a storage component 940, an output component 960, and a communication interface 970, and/or the like) may send, to a server device, a request for specimen information associated with the insect specimen, as described above. In some implementations, the request includes information identifying the location. In some implementations, the specimen information corresponds to the characteristic of the insect specimen.

As further shown in FIG. 10, process 1000 may include receiving the specimen information (block 1040). For example, the mobile device (e.g., using a processor 920, a memory 930, a storage component 940, an input component 950, and a communication interface 970, and/or the like) may receive the specimen information, as described above.

As shown in FIG. 10, process 1000 may include causing a model to perform an analysis of the specimen information in association with the location, wherein the model is configured to provide a real-time status of the location based on the specimen information (block 1050). For example, the mobile device (e.g., using a processor 920, a memory 930, a storage component 940, an output component 960, and a communication interface 970, and/or the like) may cause a model to perform an analysis of the specimen information in association with the location, as described above. In some implementations, the model is configured to provide a real-time status of the location based on the specimen information.

As further shown in FIG. 10, process 1000 may include performing an action associated with the insect specimen based on the real-time status of the location (block 1060). For example, the mobile device (e.g., using a processor 920, a memory 930, a storage component 940, an output component 960, and a communication interface 970, and/or the like) may perform an action associated with the insect specimen based on the real-time status of the location, as described above.

Process 1000 may include additional implementations, such as any single implementation or any combination of implementations described below and/or in connection with one or more other processes described elsewhere herein.

In some implementations, the image is obtained from an image capture device of the mobile device. In some implementations, the characteristic of the insect specimen comprises at least one of a species of the insect specimen, a genus of the insect specimen, or a gender of the insect specimen.

In some implementations, the mobile device may identify, based on the location, an insect trap associated with the insect specimen and obtain insect trap information associated with the insect trap. In some implementations, the characteristic is determined based on the insect trap information.

In some implementations, the specimen information includes regional specimen information associated with a region of the location. In some implementations, the regional specimen information corresponds to the characteristic. In some implementations, the region of the location is defined by at least one of a threshold range from the location or a threshold perimeter that includes the location.

In some implementations, the request is sent from within a threshold range of the location and the specimen information is received within the threshold range of the location. In some implementations, the request for the specimen information is sent based on the image of the specimen being obtained. In some implementations, the real-time status is representative of a threat level, associated with the insect specimen, at the location.

In some implementations, the mobile device, when performing the action, may indicate an alert to indicate the real-time status of the location. In some implementations, the mobile device, when performing the action, may activate a threat mitigation device associated with the insect specimen. In some implementations, the threat mitigation device is configured to treat an area of the location based on the real-time status. In some implementations, the mobile device, when performing the action, may provide the real-time status of the location to the server device.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
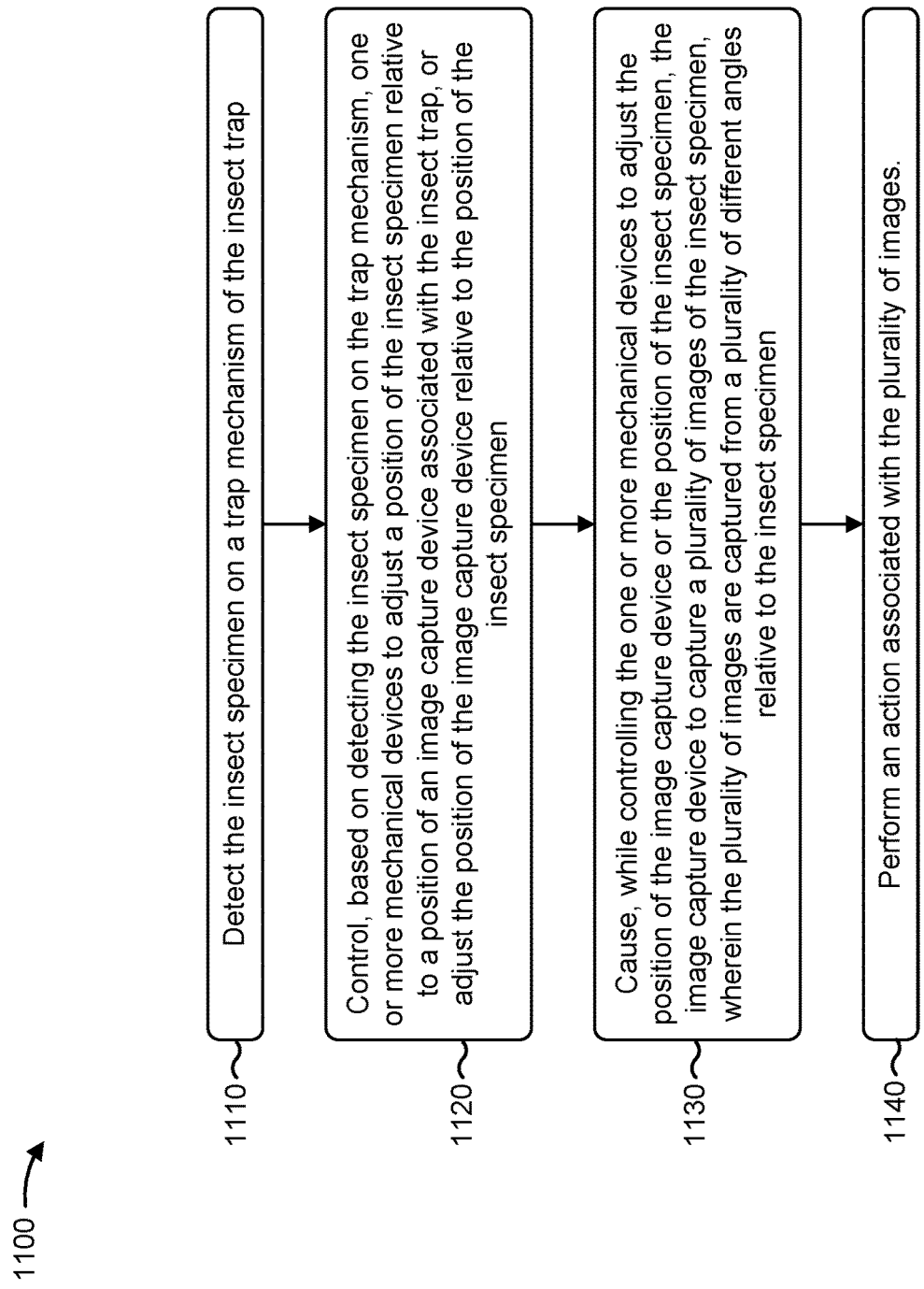

FIG. 11 is a flowchart of an example process 1100 associated with an insect specimen analysis system described herein. In some implementations, one or more process blocks of FIG. 11 may be performed by trap system controller (e.g., trap system controller 850). In some implementations, one or more process blocks of FIG. 11 may be performed by another device or a group of devices separate from or including the trap system controller, such as a mobile device (e.g., mobile device 830), a specimen management platform (e.g., specimen management platform 810), and/or the like.

As shown in FIG. 11, process 1100 may include detecting the insect specimen on a trap mechanism of the insect trap (block 1110). For example, the trap system controller (e.g., using processor 920, memory 930, storage component 940, input component 950, output component 960, communication interface 970 and/or the like) may detect the insect specimen on a trap mechanism of the insect trap, as described above.

As further shown in FIG. 11, process 1100 may include controlling, based on detecting the insect specimen on the trap mechanism, one or more mechanical devices to adjust a position of the insect specimen relative to a position of an image capture device associated with the insect trap, or and adjust the position of the image capture device relative to the position of the insect specimen (block 1120). For example, the trap system controller (e.g., using processor 920, memory 930, storage component 940, input component 950, output component 960, communication interface 970 and/or the like) may control, based on detecting the insect specimen on the trap mechanism, one or more mechanical devices to adjust a position of the insect specimen relative to a position of an image capture device associated with the insect trap, or and adjust the position of the image capture device relative to the position of the insect specimen, as described above.

As further shown in FIG. 11, process 1100 may include causing, while controlling the one or more mechanical devices to adjust the position, the image capture device to capture a plurality of images of the insect specimen, wherein the plurality of images are captured from a plurality of different angles relative to the insect specimen (block 1130). For example, the trap system controller (e.g., using processor 920, memory 930, storage component 940, input component 950, output component 960, communication interface 970 and/or the like) may cause, while controlling the one or more mechanical devices to adjust the position, the image capture device to capture a plurality of images of the insect specimen, as described above. In some implementations, the plurality of images are captured from a plurality of different angles relative to the insect specimen.

As further shown in FIG. 11, process 1100 may include performing an action associated with the plurality of images (block 1140). For example, the trap system controller (e.g., using processor 920, memory 930, storage component 940, input component 950, output component 960, communication interface 970 and/or the like) may perform an action associated with the plurality of images, as described above.

Process 1100 may include additional implementations, such as any single implementation or any combination of implementations described below and/or in connection with one or more other processes described elsewhere herein.

In some implementations, the one or more mechanical devices are configured to move the trap mechanism relative to the image capture device. In some implementations, the one or more mechanical devices are configured to move the image capture device relative to the trap mechanism.

In some implementations, the insect specimen is detected on the trap mechanism based on at least one of a signal from a sensor or an image processing analysis performed on an image captured by the image capture device. In some implementations, the trap system controller may determine a location of the insect specimen relative to the trap mechanism, assign an identifier to the insect specimen, and map information associated with the insect specimen using the identifier and the location of the insect specimen. In some implementations, the location of the insect specimen is determined based on a configuration of the one or more mechanical devices.

In some implementations, the trap controller system, when performing the action, may transmit the plurality of images to a server device to permit the server device to identify a particular characteristic of the insect specimen based on the plurality of images. In some implementations, the trap controller system, when performing the action, may identify representations of the insect specimen in each of the plurality of images based on respective configurations of the one or more mechanical devices when each of the plurality of images was captured, process the plurality of images to generate an enhanced representation of the insect specimen, and provide the enhanced representation of the insect specimen to a server device.

In some implementations, the insect specimen is a first insect specimen of a plurality of insect specimens on the trap mechanism. In some implementations, distinguishing the first insect specimen from remaining insect specimens of the plurality of insect specimens is based on the respective configurations of the one or more mechanical devices. In some implementations, aggregating the representations into the enhanced representation is based on the representations being associated with the first insect specimen. In some implementations, the enhanced representation is provided as a set of images of the representations to the server device.

In some implementations, the plurality of different angles include at least two angles that are coaxially 180 degrees relative to one another. In some implementations, the trap mechanism comprises a transparent or semi-transparent material. In some implementations, the trap mechanism comprises an adhesive material.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "are" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    capturing, by a mobile device, an image of an insect specimen,
        wherein the image is captured from a location associated with the insect specimen, and
        wherein the location is further associated with the mobile device;
    determining, by the mobile device and based on the image, a characteristic of the insect specimen;
    sending, by the mobile device and to a server device, a request for specimen information, associated with the insect specimen, to be sent to the mobile device,
        wherein the request includes information identifying the location and the characteristic of the insect specimen, and
        wherein the request is sent from within a threshold range of the location;
    receiving, by the mobile device, from the server device, and in response to the request, the specimen information,
        wherein the specimen information received by the mobile device is regional specimen information of a regional insect specimen that is in a region within the threshold range of the location, and that has the characteristic of the insect specimen that was determined based on the image;
    causing, by the mobile device, a model to perform an analysis of the received specimen information in association with the location,
        wherein the model is configured to provide a real-time status of the location based on the received specimen information, and
        wherein the real-time status includes a score indicating a safety scale; and
    performing, by the mobile device, an action associated with the insect specimen based on the real-time status of the location.

2. The method of claim 1, wherein the image is obtained from an image capture device of the mobile device.

3. The method of claim 1, wherein the characteristic of the insect specimen comprises at least one of:
    a species of the insect specimen,
    a genus of the insect specimen, or
    a gender of the insect specimen.

4. The method of claim 1, further comprising:
    identifying, based on the location, an insect trap associated with the insect specimen; and
    obtaining insect trap information associated with the insect trap,
        wherein the characteristic is determined based on the insect trap information.

5. The method of claim 1, wherein the request is sent from within the threshold range of the location and the specimen information is received within the threshold range of the location.

6. The method of claim 1, wherein the request for the specimen information is sent based on the image of the insect specimen being obtained.

7. The method of claim 1, wherein the real-time status is representative of a threat level, associated with the insect specimen, at the location.

8. The method of claim 1, wherein performing the action comprises:
    indicating an alert to indicate the real-time status of the location.

9. The method of claim 1, wherein performing the action comprises:
    activating a threat mitigation device associated with the insect specimen,
        wherein the threat mitigation device is configured to treat an area of the location based on the real-time status.

10. The method of claim 1, wherein performing the action comprises:
    providing the real-time status of the location to the server device.

11. A mobile device, comprising:
    one or more memories; and
    one or more processors, coupled to the one or more memories, configured to:
        capture an image of an insect specimen,
            wherein the image is captured from a location associated with the insect specimen, and
            wherein the location is further associated with the mobile device;
        determine, based on the image, a characteristic of the insect specimen;
        send, to a server device, a request for specimen information associated with the insect specimen to be sent to the mobile device,
            wherein the request includes information identifying the location and the characteristic of the insect specimen, and
            wherein the request is sent from within a threshold range of the location;
        receive, from the server device, and in response to the request, the specimen information,
            wherein the specimen information received by the mobile device is regional specimen information of a regional insect specimen that is in a region within the threshold range of the location, and that has the characteristic of the insect specimen that was determined based on the image;
        cause a model to perform an analysis of the received specimen information in association with the location,
            wherein the model is configured to provide a real-time status of the location based on the received specimen information, and
            wherein the real-time status includes a score indicating a safety scale; and perform an action associated with the insect specimen based on the real-time status of the location.

12. The mobile device of claim 11, wherein the characteristic of the insect specimen comprises at least one of:
   a species of the insect specimen,
   a genus of the insect specimen, or
   a gender of the insect specimen.

13. The mobile device of claim 11, wherein the one or more processors are further configured to:
   identify, based on the location, an insect trap associated with the insect specimen; and
   obtain insect trap information associated with the insect trap,
      wherein the characteristic is determined based on the insect trap information.

14. The mobile device of claim 11, wherein the request is sent from within the threshold range of the location and the specimen information is received within the threshold range of the location.

15. The mobile device of claim 11, wherein the real-time status is representative of a threat level, associated with the insect specimen, at the location.

16. The mobile device of claim 11, wherein the one or more processors, to perform the action, are configured to:
   indicate an alert to indicate the real-time status of the location.

17. The mobile device of claim 11, wherein the one or more processors, to perform the action, are configured to:
   activate a threat mitigation device associated with the insect specimen,
      wherein the threat mitigation device is configured to treat an area of the location based on the real-time status.

18. A non-transitory computer-readable medium storing a set of instructions, the set of instructions comprising:
   one or more instructions that, when executed by one or more processors of a device, cause the device to:
      capture an image of an insect specimen,
         wherein the image is captured from a location associated with the insect specimen, and
         wherein the location is further associated with the device;
      determine, based on the image, a characteristic of the insect specimen;
      send, to a server device, a request for specimen information associated with the insect specimen to be sent to the device,
         wherein the request includes information identifying the location and the characteristic of the insect specimen, and
         wherein the request is sent from within a threshold range of the location;
      receive, from the server device and in response to the request, the specimen information,
         wherein the specimen information received by the device is regional specimen information of a regional insect specimen that is in a region within the threshold range of the location, and that has the characteristic of the insect specimen that was determined based on the image;
      cause a model to perform an analysis of the specimen information in association with the location,
         wherein the model is configured to provide a real-time status of the location based on the received specimen information, and
         wherein the real-time status includes a score indicating a safety scale; and
      perform an action associated with the insect specimen based on the real-time status of the location.

19. The non-transitory computer-readable medium of claim 18, wherein the one or more instructions further cause the device to:
   identify, based on the location, an insect trap associated with the insect specimen; and
   obtain insect trap information associated with the insect trap,
      wherein the characteristic is determined based on the insect trap information.

20. The non-transitory computer-readable medium of claim 18, wherein the request is sent from within the threshold range of the location and the specimen information is received within the threshold range of the location.

21. The mobile device of claim 11, wherein the one or more processors, to perform the action, are configured to:
   activate a threat mitigation device based on a score associated with the real-time status,
      wherein the threat mitigation device is configured to treat an area of the location based on the real-time status.

22. The method of claim 1, further comprising:
   controlling one or more components of an insect trap associated with the insect specimen to capture the image.

23. The mobile device of claim 11, wherein the one or more processors, to perform the action, are configured to:
   control one or more components of an insect trap associated with the insect specimen to capture the image.

24. The non-transitory computer-readable medium of claim 18, wherein the one or more instructions further cause the device to:
   control one or more components of an insect trap associated with the insect specimen to capture the image.

* * * * *